(12) United States Patent
MacDonald et al.

(10) Patent No.: US 9,603,028 B2
(45) Date of Patent: Mar. 21, 2017

(54) MANAGEMENT OF COMMUNITY WI-FI NETWORK

(71) Applicant: Microsoft Technology Licensing, LLC, Redmond, WA (US)

(72) Inventors: David Neil MacDonald, Seattle, WA (US); Piyush Goyal, Redmond, WA (US); Saumaya Sharma, Seattle, WA (US); Shai Guday, Redmond, WA (US); Thomas Werner Kuehnel, Seattle, WA (US); Vikas Singh, Redmond, WA (US); Triptpal Singh Lamba, Bothell, WA (US); Brent Edward Ford, Sammamish, WA (US); Jonathan Hathaway, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 14/144,786

(22) Filed: Dec. 31, 2013

(65) Prior Publication Data
US 2015/0188800 A1 Jul. 2, 2015

(51) Int. Cl.
*G06F 15/173* (2006.01)
*H04W 16/18* (2009.01)
(Continued)

(52) U.S. Cl.
CPC ......... *H04W 16/18* (2013.01); *H04L 12/2854* (2013.01); *H04L 41/0896* (2013.01);
(Continued)

(58) Field of Classification Search
CPC ...... H04W 48/16; H04W 4/08; H04L 12/2854
(Continued)

(56) References Cited

U.S. PATENT DOCUMENTS 6,795,700 B2 9/2004 Karaoguz et al.
7,263,076 B1 8/2007 Leibovitz et al.
(Continued)

OTHER PUBLICATIONS

Geier, Eric, "Smartphone Tools to Keep Your Wi-Fi Network Humming," Retrieved at <<http://www.networkworld.com/reviews/2013/021113-android-wifi-analyzers-266353.html>>, Feb. 11, 2013, pp. 1-2.
(Continued)

*Primary Examiner* — Kyung H Shin
(74) *Attorney, Agent, or Firm* — Medley, Behrens & Lewis, LLC

(57) ABSTRACT

Various technologies described herein pertain to managing and accessing a community Wi-Fi network. The community Wi-Fi network can include sharer computing devices in differing local networks that share respective network bandwidth capacities with consumer computing devices. Feedback information pertaining to network bandwidth capacity available at different geographic locations covered by the community Wi-Fi network can be collected and evaluated to enable generation of maps for visualizing coverage of the community Wi-Fi network. A consumer computing device can display a map that includes visual information pertaining to the geographic coverage of the community Wi-Fi network relative to a geographic location of the consumer computing device. Community Wi-Fi network coverage can be analyzed to detect geographic locations at which network coverage is desirably added; network coverage can be added by incentivizing a potential sharer computing device to opt in to share network bandwidth capacity or controlling beamforming of sharer computing device(s).

20 Claims, 15 Drawing Sheets

(51) Int. Cl.
*H04W 4/08* (2009.01)
*H04W 48/16* (2009.01)
*H04L 12/28* (2006.01)
*H04W 4/02* (2009.01)
*H04W 24/04* (2009.01)
*H04L 12/24* (2006.01)
*H04W 24/08* (2009.01)
*H04W 84/12* (2009.01)

(52) U.S. Cl.
CPC .............. *H04L 41/22* (2013.01); *H04W 4/02* (2013.01); *H04W 4/08* (2013.01); *H04W 24/04* (2013.01); *H04W 48/16* (2013.01); *H04W 24/08* (2013.01); *H04W 84/12* (2013.01)

(58) Field of Classification Search
USPC ............ 455/456.2, 456.1; 709/224; 701/408; 370/254, 351
See application file for complete search history.

(56) References Cited

U.S. PATENT DOCUMENTS

| | | |
|---|---|---|
| 8,316,098 B2 | 11/2012 | Luna et al. |
| 8,346,225 B2 | 1/2013 | Raleigh |
| 8,364,141 B1 | 1/2013 | Kateley et al. |
| 2007/0160030 A1* | 7/2007 | Cruz .................. H04L 12/2854 370/351 |
| 2007/0167174 A1* | 7/2007 | Halcrow ............... H04W 48/16 455/456.2 |
| 2008/0089237 A1 | 4/2008 | Molen et al. |
| 2009/0267792 A1 | 10/2009 | Crichlow |
| 2010/0306530 A1 | 12/2010 | Johnson et al. |
| 2012/0008526 A1* | 1/2012 | Borghei ................. H04W 4/08 370/254 |
| 2013/0272219 A1 | 10/2013 | Singh et al. |

OTHER PUBLICATIONS

Al, et al., "Wi-Sh: A Simple, Robust Credit Based Wi-Fi Community Network," Retrieved at <<http://ieeexplore.ieee.org/stamp/stamp.jsp?tp=&arnumber=5062082>>, In Proceedings of IEEE INFOCOM 2009, Apr. 19, 2009, pp. 1638-1646.

"Written Opinion for PCT Patent Application No. PCT/US2014/068683", Mailed Date: Oct. 27, 2015, 7 Pages.

"International Search Report and Written Opinions Issued in PCT Application No. PCT/US2014/068683", Mailed Date: Mar. 4, 2015, 9 Pages.

"Response to the International Search Report (ISR) and Written Opinion for PCT Patent Application No. PCT/US2014/068683", Filed Date: Jun. 16, 2015, 10 Pages.

"Notification of Transmittal of the International Preliminary Report on Patentability for PCT Patent Application No. PCT/US2014/068683", Mailed Date: Jan. 25, 2016, 13 Pages.

* cited by examiner

MANAGEMENT OF COMMUNITY WI-FI NETWORK

BACKGROUND

Local computing networks are ubiquitous in current society. Local networks are oftentimes prevalent in homes, businesses, schools, public areas, and so forth. When connected to a local network, a computing device can use and/or access various network resources made available on the local network, such as the Internet, network attached storage, printers, other computing devices on the local network, and the like.

Access to the Internet is typically provided to a local network by an Internet service provider (ISP). An account that allocates network bandwidth capacity can be procured from the ISP for the local network. Accordingly, when the computing device is connected to the local network, the network bandwidth capacity allocated to the account (e.g., procured for the local network) can be usable by the computing device, as well as other computing devices connected to the local network.

Local networks oftentimes have excess network bandwidth capacities allocated to respective accounts procured from ISP(s). Accordingly, it may be desirable to share portions of the network bandwidth capacities available to the local networks (e.g., with computing devices other than computing devices respectively included in the local networks).

SUMMARY

Described herein are various technologies that pertain to managing and accessing a community wireless fidelity (Wi-Fi) network. The community Wi-Fi network can include sharer computing devices in differing local networks that share respective network bandwidth capacities with consumer computing devices. In accordance with various embodiments, feedback information pertaining to network bandwidth capacity available at different geographic locations covered by the community Wi-Fi network can be collected and evaluated to enable generation of maps for visualizing coverage of the community Wi-Fi network. For instance, a consumer computing device can display a map that includes visual information pertaining to the geographic coverage of the community Wi-Fi network relative to a geographic location of the consumer computing device. Moreover, in some embodiments, the coverage of the community Wi-Fi network can be analyzed to detect geographic locations at which network coverage is desirably added; network coverage can be added at such geographic locations by incentivizing a potential sharer computing device to opt in to share network bandwidth capacity, controlling beamforming of sharer computing device(s), and so forth.

According to various embodiments, a community management system can receive feedback information pertaining to network bandwidth capacity available at different geographic locations covered by the community Wi-Fi network. The feedback information can be received from the consumer computing devices (or a subset thereof), for example. Additionally or alternatively, the feedback information can be received from the sharer computing devices (or a subset thereof) included in the community Wi-Fi network. The community management system can generate network coverage data indicative of geographic coverage of the community Wi-Fi network based upon the feedback information. For instance, the community management system can evaluate community rating metrics in real-time or batch to generate the network coverage data. The community management system, for example, can transmit the network coverage data to the consumer computing devices (e.g., for displaying maps on respective display screens of the consumer computing devices pertaining to geographic coverage of the community Wi-Fi network).

In various embodiments, operation of a consumer computing device in the community Wi-Fi network can include receiving network coverage data at the consumer computing device. The network coverage data can be indicative of geographic coverage of the community Wi-Fi network. Moreover, a map can be displayed on a display screen of the consumer computing device. The map can include visual information pertaining to the geographic coverage of the community Wi-Fi network relative to a geographic location of the consumer computing device. The visual information can depict historic network performance and/or real-time network performance, which can be specified by the network coverage data. Further, visual indicator(s) can be displayed on the display screen of the consumer computing device that specify types of application(s) available and/or unavailable for execution by the consumer computing device based upon network bandwidth capacity available for the consumer computing device via the community Wi-Fi network at the geographic location. Moreover, the visual information can be adjusted over time as network performance changes. For example, when the consumer computing device is at a particular geographic location, the community Wi-Fi network can initially support streaming video when few consumer computing devices are at or near the particular geographic location, while the community Wi-Fi network can later support email or web-browsing as the particular geographic location becomes more crowded. Such changes over time can be shown by modifying the visual information over time.

Moreover, in accordance with various embodiments, the community management system can detect a geographic location at which network coverage is desirably added based upon the network coverage data. A potential sharer computing device positioned in the geographic location can be identified. Further, an incentive can be provided to the potential sharer computing device in attempt to cause the potential sharer computing device to join the community Wi-Fi network (e.g., to share respective network bandwidth capacity of the potential sharer computing device with consumer computing devices as part of the community Wi-Fi network). Thus, upon selection to opt the potential sharer computing device in to the community Wi-Fi network, an account corresponding to such potential sharer computing device can be credited according to the incentive.

As noted above, consumer computing devices can access the community Wi-Fi network and utilize various resources made available by the sharer computing devices via the community Wi-Fi network. According to various embodiments, the community Wi-Fi network can support users that both share and consume network bandwidth capacity as part of the community Wi-Fi network (e.g., an account of a user can be associated with sharer computing device(s) and consumer computing device(s)); thus, such users can earn credits based upon network bandwidth capacity shared by the sharer computing device(s) of the users with other consumer computing devices and can earn debits based upon network bandwidth capacity shared by other sharer computing devices consumed by the consumer computing device(s) of the users. In accordance with other embodiments, prepaid access to the community Wi-Fi network can be purchased.

Pursuant to other embodiments, a client application can be executed on a consumer computing device that runs on a platform that differs from the community Wi-Fi network, where the client application can enable the consumer computing device to access the community Wi-Fi network.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
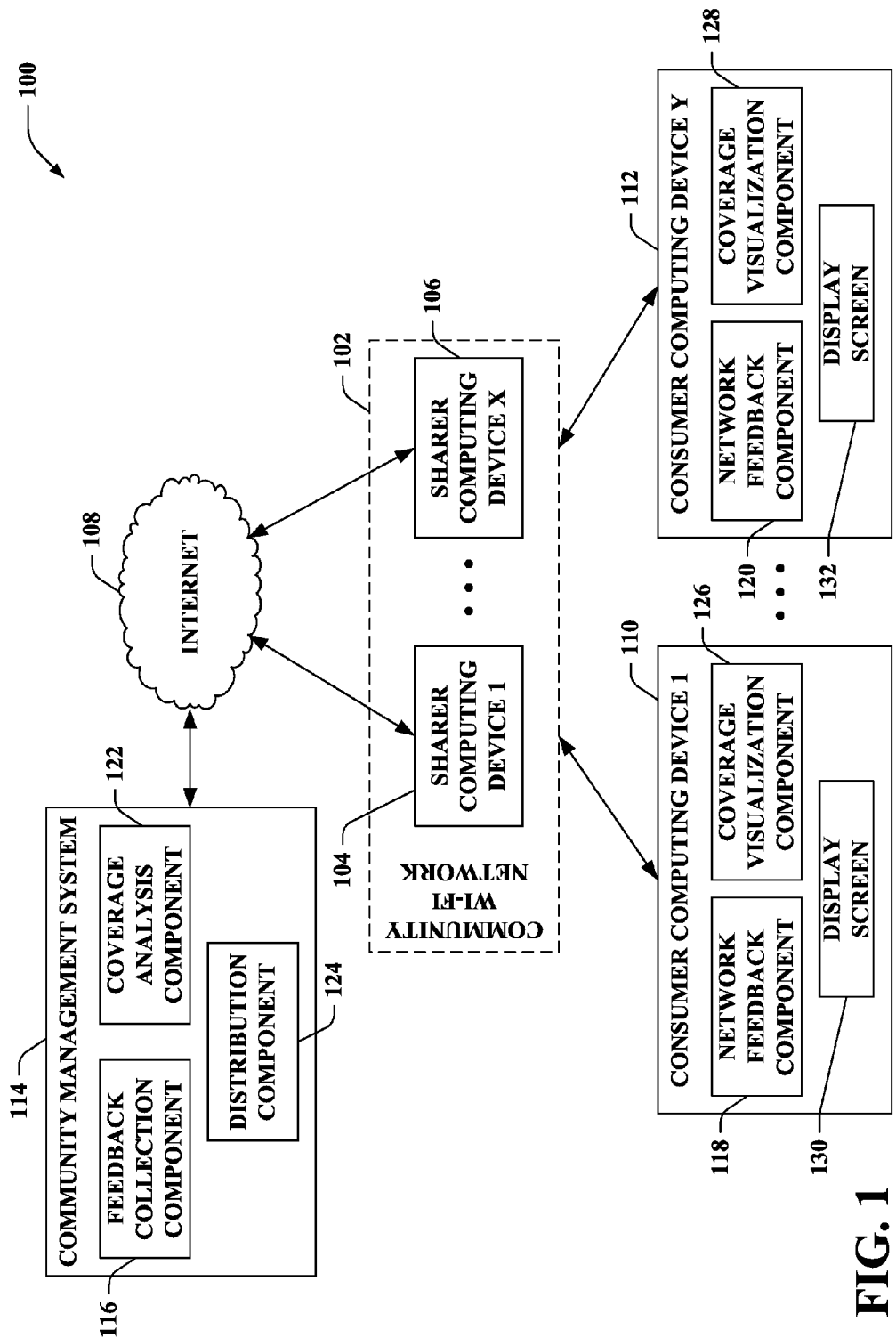
FIG. 1 illustrates a functional block diagram of an exemplary system that manages a community Wi-Fi network.

Various technologies pertaining to managing and accessing a community wireless fidelity (Wi-Fi) network are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that manages a community Wi-Fi network 102. The community Wi-Fi network 102 includes a sharer computing device 1 104, . . . , and a sharer computing device X 106, where X can be substantially any integer (collectively referred to herein as sharer computing devices 104-106). The sharer computing devices 104-106 can be in differing local networks. Moreover, the sharer computing devices 104-106 share respective network bandwidth capacities available to the local networks that include the sharer computing devices 104-106. Thus, the community Wi-Fi network 102 can be a mesh of sharer computing devices 104-106 that have been joined to such network.

According to an example, the sharer computing device 1 104 can be in a first local network and the sharer computing device X 106 can be in a second local network, where the first local network differs from the second local network. Following this example, the sharer computing device 1 104 can share network bandwidth capacity available to the first local network and the sharer computing device X 106 can share network bandwidth capacity available to the second local network.

The local networks that include the sharer computing devices 104-106 can each have a respective account that allocates a network bandwidth capacity (e.g., to the Internet 108) procured from an access provider. For instance, a local network that includes the sharer computing device 1 104 and a local network that includes the sharer computing device X 106 can each have a respective account that allocates a network bandwidth capacity procured from an access provider (e.g., an Internet service provider (ISP), a mobile network, etc.). It is to be appreciated that the same and/or differing access providers can provide the network bandwidth capacity for the respective accounts for the local networks that include the sharer computing devices 104-106 included in the community Wi-Fi network 102.

The sharer computing devices 104-106 in the community Wi-Fi network 102 can share respective network bandwidth capacities (e.g., for the respective local networks) with one or more consumer computing devices of the community Wi-Fi network 102. More particularly, the sharer computing devices 104-106 can share respective network bandwidth capacities with a consumer computing device 1 110, . . . , and a consumer computing Y 112, where Y can be substantially any integer (collectively referred to herein as consumer computing devices 110-112). Thus, a consumer computing device (e.g., one of the consumer computing devices 110-112) is a computing device that consumes network bandwidth capacity shared by one or more of the sharer computing devices 104-106 in the community Wi-Fi network 102.

The consumer computing devices 110-112 can each be substantially any type of computing device. For example, a consumer computing device can be a mobile device such as a mobile phone (e.g., smartphone), a tablet computer, a handheld computer, a laptop computer, a wearable computer, a personal digital assistant (PDA), a portable gaming device, an in-vehicle communications and infotainment system, or the like. According to other examples, a consumer computing device can be a personal computer, a gaming console, and so forth.

Moreover, it is contemplated that the sharer computing devices 104-106 can each be substantially any type of computing device. For instance, a sharer computing device can be an access point, a router, a personal computer, a gaming console, a mobile device, or the like.

The system 100 further includes a community management system 114. The community management system 114 can be a distributed system (e.g., distributed across a plurality of computing devices), for example. In accordance with various embodiments, the sharer computing devices 104-106 of the community Wi-Fi network 102 can include the community management system 114 (e.g., the community management system 114 can be distributed across the sharer computing devices 104-106). By way of another example, a server computing device (not shown) can include the community management system 114.

The community management system 114 can collect feedback information pertaining to network coverage of the community Wi-Fi network 102 and evaluate the feedback information. The community management system 114, for instance, can evaluate community rating metrics based upon the feedback information to enable creation of heat maps in real time or batch.

The sharer computing devices 104-106 can each have a respective coverage area. Accordingly, a coverage area of the community Wi-Fi network 102 can be a union of the coverage areas for each of the sharer computing devices 104-106 included in the community Wi-Fi network 102. The community management system 114 can collect the feedback information pertaining to the coverage area of the community Wi-Fi network 102. For instance, maps can be created to enable visualizing the coverage area of the community Wi-Fi network 102. Additionally or alternatively, geographic areas at which it is desirable to add network coverage can be identified based upon the coverage area of the community Wi-Fi network 102.

More particularly, the community management system 114 can include a feedback collection component 116 that receives feedback information pertaining to network bandwidth capacity available at different geographic locations covered by the community Wi-Fi network 102. The feedback collection component 116 can receive the feedback information from the consumer computing devices 110-112 (or a subset thereof). Additionally or alternatively, the feedback collection component 116 can receive the feedback information from the sharer computing devices 104-106 (or a subset thereof).

The consumer computing devices 110-112 can include network feedback components; thus, the consumer computing device 1 110 can include a network feedback component 118, . . . , and the consumer computing device Y 112 can include a network feedback component 120. The network feedback component 118 of the consumer computing device 1 110 is described in greater detail below. While not explicitly described, it is contemplated that the network feedback components of the disparate consumer computing devices (e.g., the consumer computing devices 110-112 other than the consumer computing device 110) can be substantially similar to the network feedback component 118 of the consumer computing device 1 110. Further, it is to be appreciated that a subset of the consumer computing devices 110-112 can lack network feedback components; yet, the claimed subject matter is not so limited.

The network feedback component 118 of the consumer computing device 1 110 can measure network bandwidth capacity available at a geographic location of the consumer computing device 1 110. Moreover, the network feedback component 118 can transmit, to the community management system 114, feedback information pertaining to the network bandwidth capacity available at the geographic location measured by the consumer computing device 1 110. The feedback information can be transmitted from the consumer computing device 1 110 to the community management system 114 via the community Wi-Fi network 102 and/or a differing network (e.g., a mobile operator network, etc.). Further, according to an example, the network feedback component 118 can send the feedback information in real time responsive to measurement or in batch (e.g., responsive to the consumer computing device 1 110 being connected to the community Wi-Fi network 102 and sufficient network bandwidth capacity being available for the consumer computing device 1 110 to transmit the feedback information to the community management system 114).

The network feedback component 118 can measure signal strengths, perform active tests, or the like at the geographic location of the consumer computing device 1 110. Moreover, the network feedback component 118 can track types of applications executed by the consumer computing device 1 110 utilizing the community Wi-Fi network 102 at the geographic location of the consumer computing device 1 110, whether errors are encountered during execution of such types of applications (e.g., due to lack of sufficient network bandwidth capacity), or the like. By way of another example, the network feedback component 118 can obtain user feedback explicitly supplied by a user of the consumer computing device 1 110 pertaining to the user's perceived experience at the geographic location of the consumer computing device 1 110. Further, the aforementioned information pertaining to network bandwidth capacity of the community Wi-Fi network 102 can be sent to the community management system 114 as part of the feedback information.

For example, the network feedback component 118 can perform an active test by making a test audio call to a test server (not shown). The test audio call may be inaudible on the consumer computing device 1 110. During the test audio call, the network feedback component 118 can play an audio file which can be transmitted over the connection to the test server, a looped-back signal can be obtained by the network feedback component 118, and the network feedback component 118 can measure quality of the looped-back signal to determine call quality for the geographic location of the consumer computing device 1 110. A quality of experience score can be assigned to the test audio call, which measures the call quality. Such score for the given geographic location of the consumer computing device 1 110 can thus be reported back to the community management system 114 as part of the feedback information. In addition to reporting the score, the network feedback component 118 can identify a sharer computing device from the sharer computing device 104-106 to which the consumer computing device 1 110 is connected when performing the test audio call.

The feedback collection component 116 can receive the feedback information pertaining to the network bandwidth capacity from the consumer computing devices 110-112. Moreover, the community management system 114 can include a coverage analysis component 122 that generates network coverage data indicative of geographic coverage of the community Wi-Fi network 102 based upon the feedback information. For instance, the coverage analysis component 122 can determine types of applications that can be executed at various geographic locations within the geographic coverage of the community Wi-Fi network 102; yet, the claimed subject matter is not so limited. The community management system 114 can also include a distribution component 124 that can transmit the network coverage data generated by the coverage analysis component 122 to the consumer computing devices 110-112.

The consumer computing devices 110-112 can include coverage visualization components that display maps on display screens as a function of the network coverage data. More particularly, the consumer computing device 1 110 can include a coverage visualization component 126 and a display screen 130, . . . , and the consumer computing device Y 112 can include a coverage visualization component 128 and a display screen 132. While many of the below examples described the coverage visualization component 126 of the consumer computing device 1 110, it is to be appreciated that disparate coverage visualization components of other consumer computing devices (e.g., the consumer computing devices 110-112 other than the consumer computing device 1 110) can be substantially similar to the coverage visualization component 126 described herein. Further, it is contemplated that a subset of the consumer computing devices 110-112 can lack a coverage visualization component; yet, the claimed subject matter is not so limited.

The coverage visualization component 126 of the consumer computing device 1 110 can receive, at the consumer computing device 1 110, the network coverage data indicative of geographic coverage of the community Wi-Fi network 102 sent by the distribution component 124 of the community management system 114. Moreover, the coverage visualization component 126 can display a map on the display screen 130 of the consumer computing device 1 110. The map can include visual information pertaining to the geographic coverage of the community Wi-Fi network 102 relative to the geographic location of the consumer computing device 1 110. The visual information can depict historic network performance and/or real-time network performance, which can be specified by the network coverage data.

According to an example, the network coverage data, generated by the coverage analysis component 122 can specify one or more types of applications available for execution by the consumer computing devices across the geographic coverage of the community Wi-Fi network 102. Accordingly, upon receipt of the network coverage data, the coverage visualization component 126 can display a visual indicator on the display screen 130 of the consumer computing device 1 110 that specifies the one or more types of applications available for execution by the consumer computing device 1 110 based upon network bandwidth capacity available for the consumer computing device 1 110 via the community Wi-Fi network 102 at the geographic location of the consumer computing device 1 110. Additionally or alternatively, the coverage visualization component 126 can display a visual indicator on the display screen 130 of the consumer computing device 1 110 that specifies one or more types applications unavailable for execution by the consumer computing device 1 110 based upon the network bandwidth capacity available for the consumer computing device 1 110 via the community Wi-Fi network 102 at the geographic location of the consumer computing device 1 110. According to an example, the visual indicator can be an overlay on the map displayed on the display screen 130 by the coverage visualization component 126. According to another example, the visual indicator can be a list rendered on the display screen 130 that specifies the one or more types of applications available and/or unavailable for execution by the consumer computing device 1 110 when positioned at the geographic location. Yet, other types of visual indicators are intended to fall within the scope of the hereto appended claims.

By way of illustration, the coverage visualization component 126 can obtain the network coverage data, which can specify that a voice call can be effectuated at the geographic location of the consumer computing device 1 110, while a video conference call is unavailable at the geographic location of the consumer computing device 1 110. Thus, the coverage visualization component 126 can provide a visual indicator rendered on the display screen 130 by the coverage visualization component 126 specifying the availability of the voice call and unavailability of the video conference call; yet, the claimed subject matter is not limited to the foregoing illustration.

A community can have various community assets. For instance, a community can be associated a community intranet portal, community document and file management system, a community social network, a community collaboration system, or the like. The community Wi-Fi network 102 can make available the community assets to members of a group that joined the community Wi-Fi network 102. Further, the community Wi-Fi network 102 can enable services restricted to the members of the group that joined the community Wi-Fi network 102, such as peer-to-peer communications between clients (e.g., between consumer computing devices 110-112).

Figure 2:
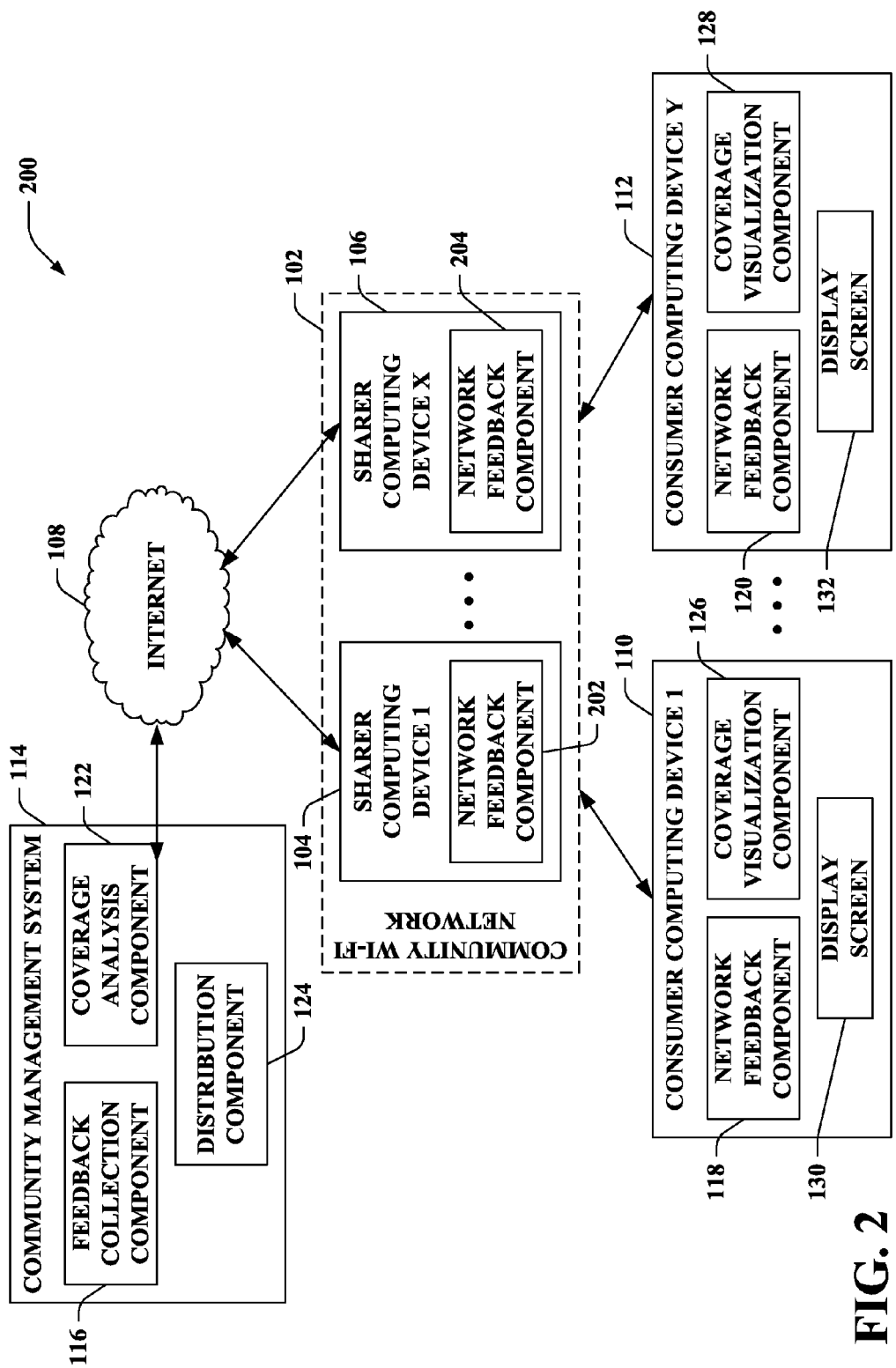
FIG. 2 illustrates a functional block diagram of another exemplary system that manages the community Wi-Fi network.

With reference to FIG. 2, illustrated is another system 200 that manages the community Wi-Fi network 102. In the system 200, the sharer computing devices 104-106 included in the community Wi-Fi network 102 can further provide feedback information pertaining to the network bandwidth capacity available at differing geographic locations to the community management system 114 (e.g., the feedback collection component 116). More particularly, the sharer computing device 1 104 can include a network feedback component 202, . . . , and the sharer computing device X 106 can include a network feedback component 204. It is contemplated, however, that a subset of the sharer computing devices 104-106 need not include a network feedback component. While the below discussion pertains to the network feedback component 202, it is to be appreciated that the other network feedback components of differing sharer computing devices (e.g., the sharer computing devices 104-106 other than the sharer computing device 1 104) can be substantially similar to the network feedback component 202.

Similar to the network feedback component 118 of the consumer computing device 1 110, the network feedback component 202 can measure the network bandwidth capacity available at a geographic location of the sharer computing device 1 104. Further, the network feedback component 202 can transmit, to the community management system 114, feedback information pertaining to the network bandwidth capacity available at the geographic location of the sharer computing device 1 104 measured by the sharer computing device 1 104.

Accordingly, the feedback collection component 116 of the community management system 114 can receive feedback information pertaining to the network bandwidth capacity available at differing geographic locations covered by the community Wi-Fi network 102 from the sharer computing devices 104-106. It is contemplated that the feedback collection component 116 can also receive feedback information from the consumer computing devices 110-112; yet, it is contemplated that the consumer component devices 110-112 may not provide feedback information to the feedback collection component 116 in some embodiments. Thus, the network coverage data generated by the coverage analysis component 122 can be based at least in part upon the feedback information collected by the feedback collection component 116 from the consumer computing devices 110-112 and/or the sharer computing devices 104-106.

Figure 3:
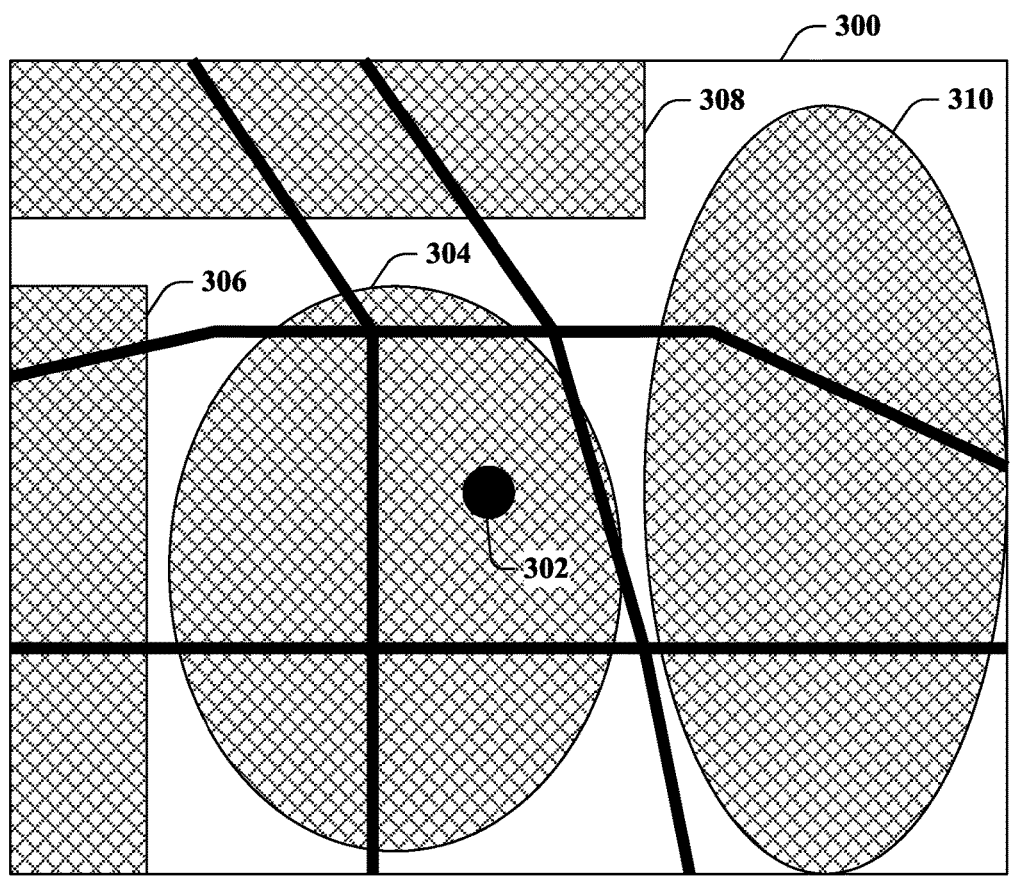
FIGS. 3-4 illustrate exemplary maps that can be displayed on a display screen of a consumer computing device.
Figure 4:
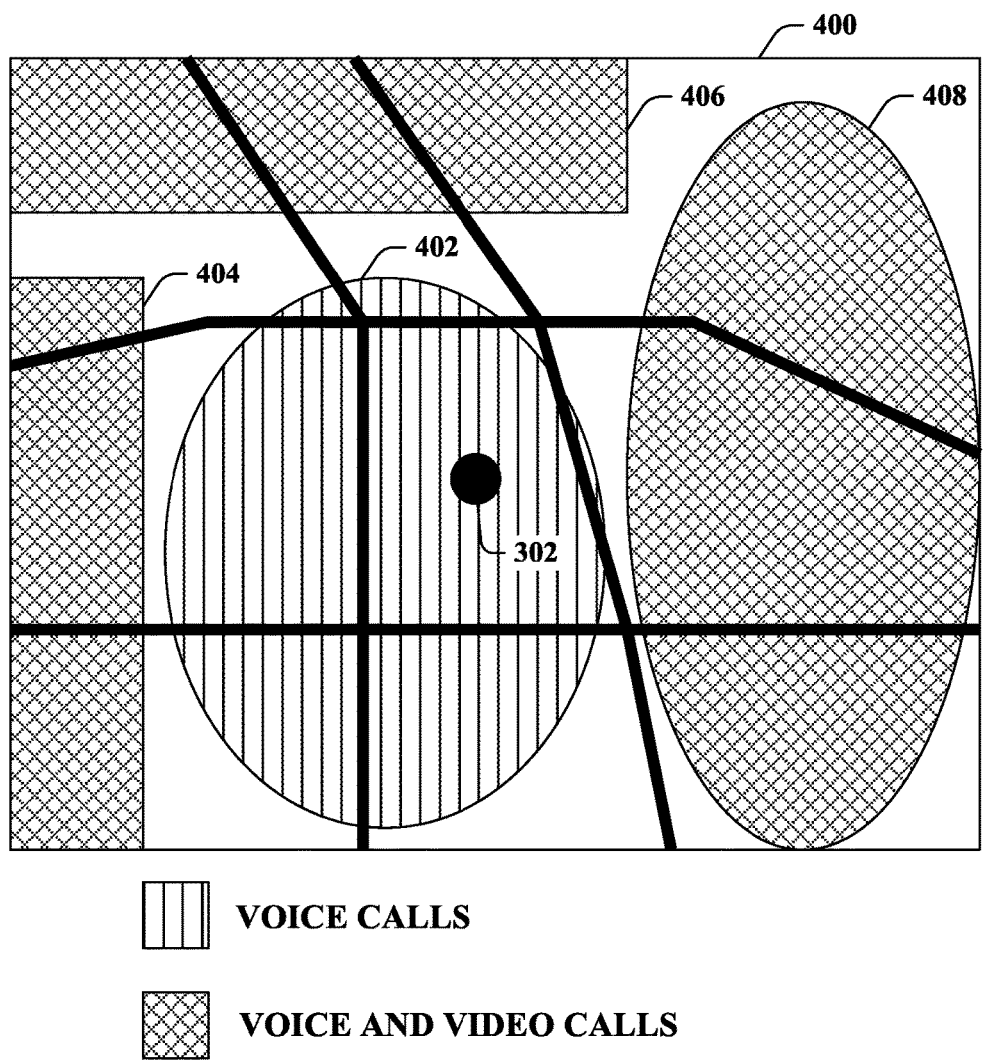

FIGS. 3-4 illustrate exemplary maps that can be displayed on a display screen of a consumer computing device (e.g., one of the consumer computing devices 110-112 of FIG. 1). It is to be appreciated, however, that the claimed subject matter is not limited to such examples set forth in FIGS. 3-4.

With reference to FIG. 3, illustrated is a map 300 that can be displayed on a display screen of a consumer computing device. The map 300 includes an indicator 302 showing a geographic location of the consumer computing device. The map 300 also includes various geographic information, such as roads, intersections, or other points of interest. Further, the map 300 includes visual information pertaining to the geographic coverage of a community Wi-Fi network (e.g., the community Wi-Fi network 102 of FIG. 1) relative to the geographic location 302 of the consumer computing device. In the example set forth in FIG. 3, the visual information that shows the geographic coverage of the community Wi-Fi network is presented as shaded regions 304, 306, 308, and 310 (collectively referred to herein as shaded regions 304-310) included in the map 300. Accordingly, the shaded regions 304-310 represent geographic locations at which the community Wi-Fi network is available to the consumer computing device, while non-shaded regions included in the map 300 indicate geographic locations at which the community Wi-Fi network is unavailable for the consumer computing device. For example, the shaded regions 304-310 can represent geographic locations at which the community Wi-Fi network is historically available and/or available in real time. Moreover, the visual information (e.g., the shaded regions 304-310) can change over time based upon community Wi-Fi network performance changes.

With reference to FIG. 4, illustrated is another exemplary map 400 that can be displayed on the display screen of the consumer computing device. Again, the map 400 includes the indicator 302 showing the geographic location of the consumer computing device, as well as the geographic information showing various roads, intersections, points of interest, etc. Further, the map 400 includes shaded regions 402, 404, 406, and 408 (collectively referred to herein as shared regions 402-408) (e.g., the visual information), which represent geographic locations at which the community Wi-Fi network is available for the consumer computing device.

In contrast to the map 300 of FIG. 3, the map 400 of FIG. 4 includes different shaded regions to convey visual information that specifies the types of applications that are available or unavailable at differing geographic locations. In the illustrated example, the shaded region 402 represents geographic locations at which voice calls are available for execution by the consumer computing device, while the shared regions 404-408 represent geographic locations at which voice and video calls are available for execution by the consumer computing device. Accordingly, video calls can be unavailable at geographic locations corresponding to the shared region 402. Moreover, the community Wi-Fi network can be unavailable for the consumer computing device at non-shaded regions included in the map 400.

Figure 5:
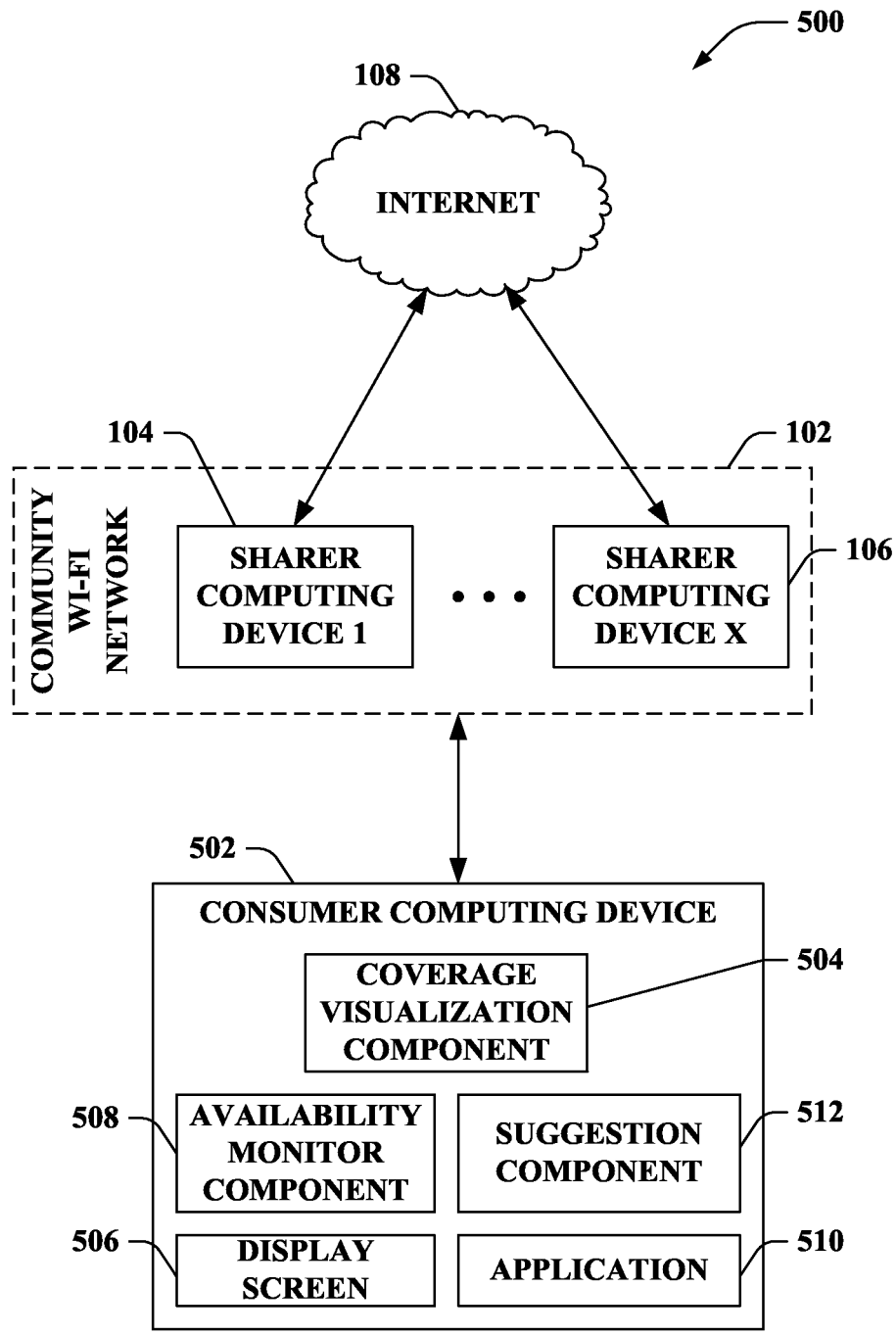
FIG. 5 illustrates a functional block diagram of an exemplary system that employs suggestions for achieving a threshold bandwidth for performing a desired type of application.

Moreover, the visual information (e.g., the shaded regions 402-408) can be adjusted over time as network performance changes. For example, when the consumer computing device is at a particular geographic location, the community Wi-Fi network can initially support streaming video when few consumer computing devices are at or near the particular geographic location, while the community Wi-Fi network can later support email or web-browsing as the particular geographic location becomes more crowded. Such changes over time can be shown by modifying the visual information over time Turning to FIG. 5, illustrated is a system 500 that employs suggestions for achieving a threshold bandwidth for performing a desired type of application. The system 500 includes the community Wi-Fi network 102, which includes the sharer computing devices 104-106. Although not shown, it is further contemplated that the system 500 can include the community management system 114 of FIG. 1. Moreover, the system 500 includes a consumer computing device 502 (e.g., one of the consumer computing devices 110-112). Similar to the consumer computing devices 110-112, the consumer computing device 502 can include a coverage visualization component 504 and a display screen 506.

The consumer computing device 502 further includes an availability monitor component 508. The availability monitor component 508 can receive information specifying a desired type of application 510 for execution by the consumer computing device 502 via the community Wi-Fi network 102. Examples of the type of the application 510 include voice calls, video conference calls, streaming audio, streaming video, text messaging, web browsing, and so forth; yet, it is contemplated that substantially any other type of application 510 is intended to fall within the scope of the hereto appended claims.

The availability monitor component 508 can determine whether a threshold network bandwidth capacity for the desired type of application 510 is available for the consumer computing device 502 at the geographic location of the consumer computing device 502 via the community Wi-Fi network 102. For instance, the availability monitor component 508 can analyze received network coverage data (e.g., received from the community management system 114 of FIG. 1) to determine whether the threshold network bandwidth capacity for the desired type of application 510 is available.

When the availability monitor component 508 determines that the threshold network bandwidth capacity is available for the consumer computing device 502 at the geographic location via the community Wi-Fi network 102, the consumer computing device 502 can initiate the desired type of application 510. Alternatively, when the availability monitor component 508 determines that the threshold network bandwidth capacity is unavailable for the consumer computing device 502 at the geographic location via the community Wi-Fi network 102, then the consumer computing device 502 can be inhibited from initiating the desired type of application 510 until the threshold network bandwidth capacity is available.

The consumer computing device 502 can further include a suggestion component 512. The suggestion component 512 can display a suggestion on the display screen 506 of the consumer computing device 502 for achieving the threshold network bandwidth capacity. Thus, when the availability monitor component 508 determines that the threshold network bandwidth capacity is unavailable for the consumer computing device 502 at the geographic location via the community Wi-Fi network 102, then the suggestion component 512 can display a suggestion on the display screen 506 for achieving the threshold network bandwidth capacity. By way of example, the suggestion component 512 can provide indicators on the display screen 506 specifying options to achieve the threshold network bandwidth capacity for performing the type of application 510.

It is to be appreciated that substantially any type of suggestion can be output by the suggestion component 512. While many of the examples set forth herein pertain to a suggestion being displayed on the display screen 506, it is contemplated that the suggestion component 512 can output the suggestion as audio output, haptic feedback, or the like.

By way of example, the suggestion provided by the suggestion component 512 can specify a disparate geographic location for repositioning of the consumer computing device 502. Following this example, the threshold network bandwidth capacity can be available for the consumer computing device 502 at the disparate geographic location via the community Wi-Fi network 102. According to another example, the suggestion component 512 can provide information enabling a user of the consumer computing device 502 to pay for service upgrade to achieve the threshold network bandwidth capacity at the geographic location of the consumer computing device 502 via the community Wi-Fi network 102. Yet, it is to be appreciated that other types of suggestions can additionally or alternatively be provided by the suggestion component 512.

Figure 6:
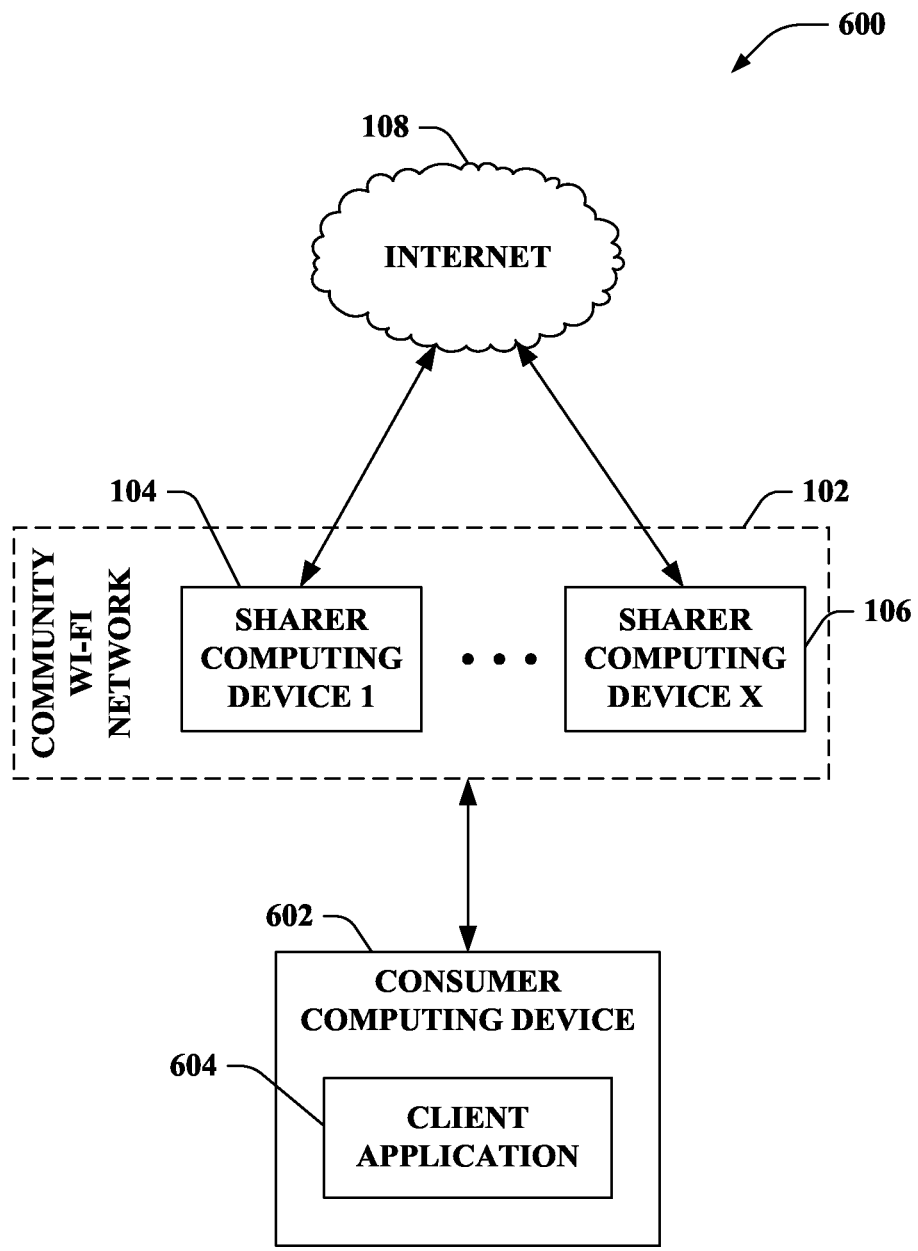
FIG. 6 illustrates a functional block diagram of an exemplary system that provides access to the community Wi-Fi network.

With reference to FIG. 6, illustrated is a system 600 that provides access to the community Wi-Fi network 102. The system 600 includes the community Wi-Fi network 102 (e.g., including the sharer computing devices 104-106) and a consumer computing device 602 (e.g., one of the consumer computing devices 110-112 of FIG. 1).

Bandwidth consumers of the community Wi-Fi network 102 (e.g., who may or may not provide shared network bandwidth capacity to disparate users) can access the community Wi-Fi network 102. According to various embodiments, prepaid access to the community Wi-Fi network can be purchased for an account associated with the consumer computing device 602. For instance, the prepaid access for the account can specify an amount of bandwidth that can be consumed by the consumer computing device 602, a level of service for the account, and so forth.

According to another example, the consumer computing device 602 can run on a platform that differs from the community Wi-Fi network 102. Following this example, the consumer computing device 602 can execute a client application 604 that enables the consumer computing device 602 to access the community Wi-Fi network 102.

Figure 7:
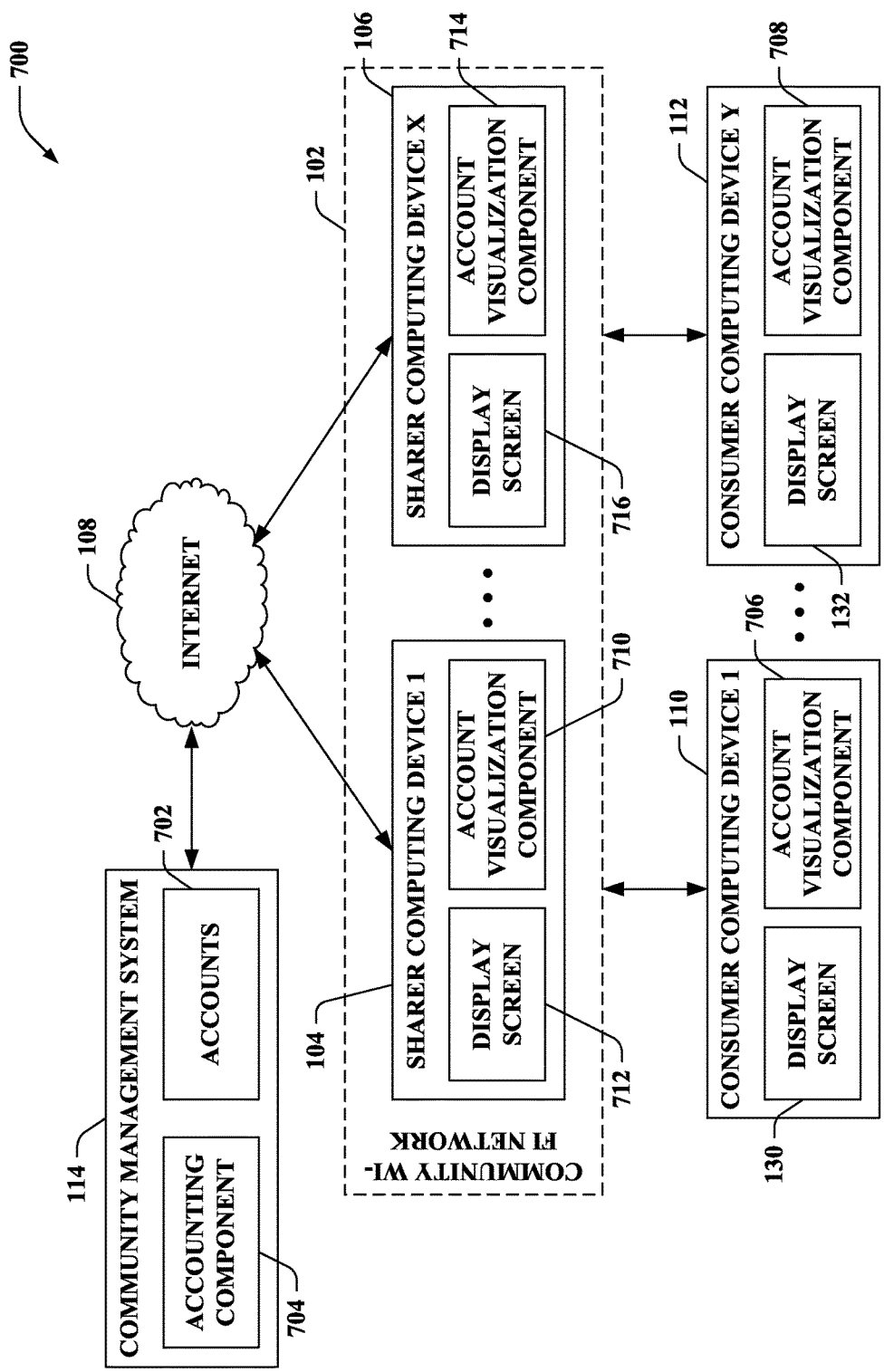
FIG. 7 illustrates a functional block diagram of an exemplary system that tracks consumption and sharing of network bandwidth capacity as part of the community Wi-Fi network.

Turning to FIG. 7, illustrated is a system 700 that tracks consumption and sharing of network bandwidth capacity as part of the community Wi-Fi network 102. The community management system 114 can maintain accounts 702 of users of the consumer computing devices 110-112 and the sharer computing devices 104-106. Moreover, the community management system 114 can include an accounting component 704 that assigns credits and debits to the accounts 702. For instance, the accounting component 704 can net meter consumption and sharing of network bandwidth capacity by the consumer computing devices 110-112 and the sharer computing devices 104-106. Although not shown, it is further to be appreciated that the sharer computing devices 104-106 and/or the consumer computing devices 110-112 can similarly maintain accounts (e.g., to verify account values).

By way of example, an account of a user can be assigned credits by the accounting component 704 based upon a sharer computing device of such user contributing network bandwidth capacity for consumption by the consumer computing devices 110-112. Further, the account of such user can be assigned debits by the accounting component 704 based upon a consumer computing device of such user consuming network bandwidth capacity shared by the sharer computing devices 104-106.

It is contemplated that a computing device can be a sharer computing device in various scenarios, while being a consumer computing device in other scenarios (e.g., depending on location of such device). Thus, the computing device can share network bandwidth capacity (e.g., with the consumer computing devices 110-112) when positioned in some geographic locations. Further, when positioned in other geographic locations, the computing device can consume network bandwidth capacity shared by other computing devices (e.g., the sharer computing devices 104-106).

The consumer computing devices 110-112 and the sharer computing devices 104-106 can include account visualization components. An account visualization component can receive account usage information from the community management system 114 and display the account usage information on a display screen of a corresponding computing device. For instance, the consumer computing device 1 110 can include an account visualization component 706, which can display account usage information on the display screen 130 of the consumer computing device 1 110. The account usage information can be indicative of at least consumption of network bandwidth capacity via the community Wi-Fi network 102 for an account corresponding to the consumer computing device 1 110. Likewise, disparate consumer computing devices can also include account visualization components, which can be substantially similar to the account visualization component 706 (e.g., the consumer computing device Y 112 can include an account visualization component 708 which can similarly display account usage information on the display screen 132).

According to various embodiments, it is further contemplated that the sharer computing devices 104-106 can include account visualization components, which can display account usage information on respective display screens (e.g., the sharer computing device 1 104 can include an account visualization component 710 and a display screen 712, . . . , and the sharer computing device X 106 can include an account visualization component 714 and a display screen 716). For instance, the account visualization component 710 of the sharer computing device 1 104 can display account usage information on the display screen 712 of the sharer computing device 1 104, where the account usage information is indicative of at least sharing of network bandwidth capacity by the sharer computing device 1 104.

Pursuant to various embodiments, the account usage information displayed on a display screen of a sharer computing device or a consumer computing device can include information indicative of both sharing of network bandwidth capacity and consumption of network bandwidth capacity as part of the community Wi-Fi network 102 for an account corresponding to the consumer computing device and the sharer computing device; yet, the claimed subject matter is not so limited.

Moreover, an account visualization component can further display geographic usage information on a map rendered on a display screen of a computing device (e.g., the map displayed on the display screen by a coverage visualization component). For instance, the account visualization component 706 can display geographic usage information on a map on the display screen 130 of the consumer computing device 1 110. The geographic usage information can be indicative of geographic locations at which the consumer computing device 1 110 previously consumed network bandwidth capacity of the community Wi-Fi network 102.

Figure 8:
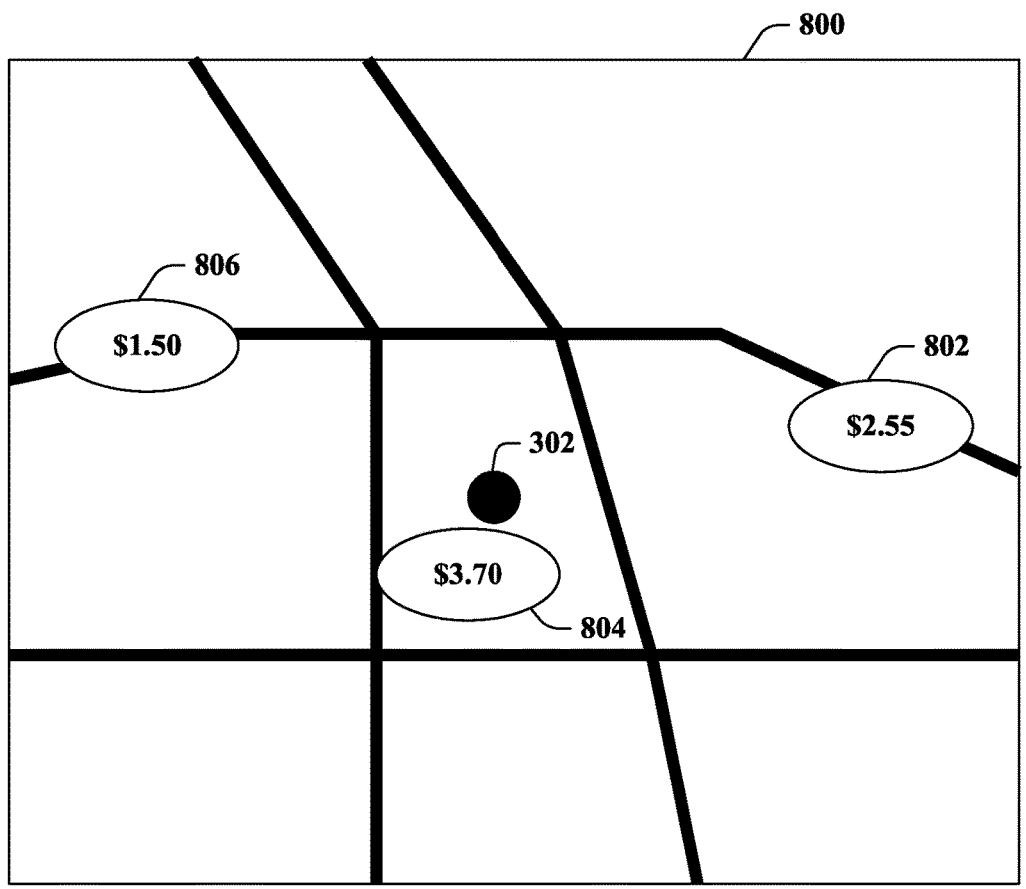
FIG. 8 illustrates another exemplary map that can be displayed on the display screen of the consumer computing device.

Turning to FIG. 8, illustrated is an exemplary map 800 that can be displayed on a display screen of a consumer computing device. The map 800 includes geographic usage information indicative of geographic locations at which the consumer computing device previously consumed network bandwidth capacity of the community Wi-Fi network. For instance, the map 800 includes geographic usage information specifying three locations 802, 804, and 806 at which network bandwidth capacity was previously consumed by the consumer computing device. Further, amount of network bandwidth capacity consumed at each of the three locations 802, 804, and 806 are indicated on the map 800 (e.g., as dollar amounts).

Figure 9:
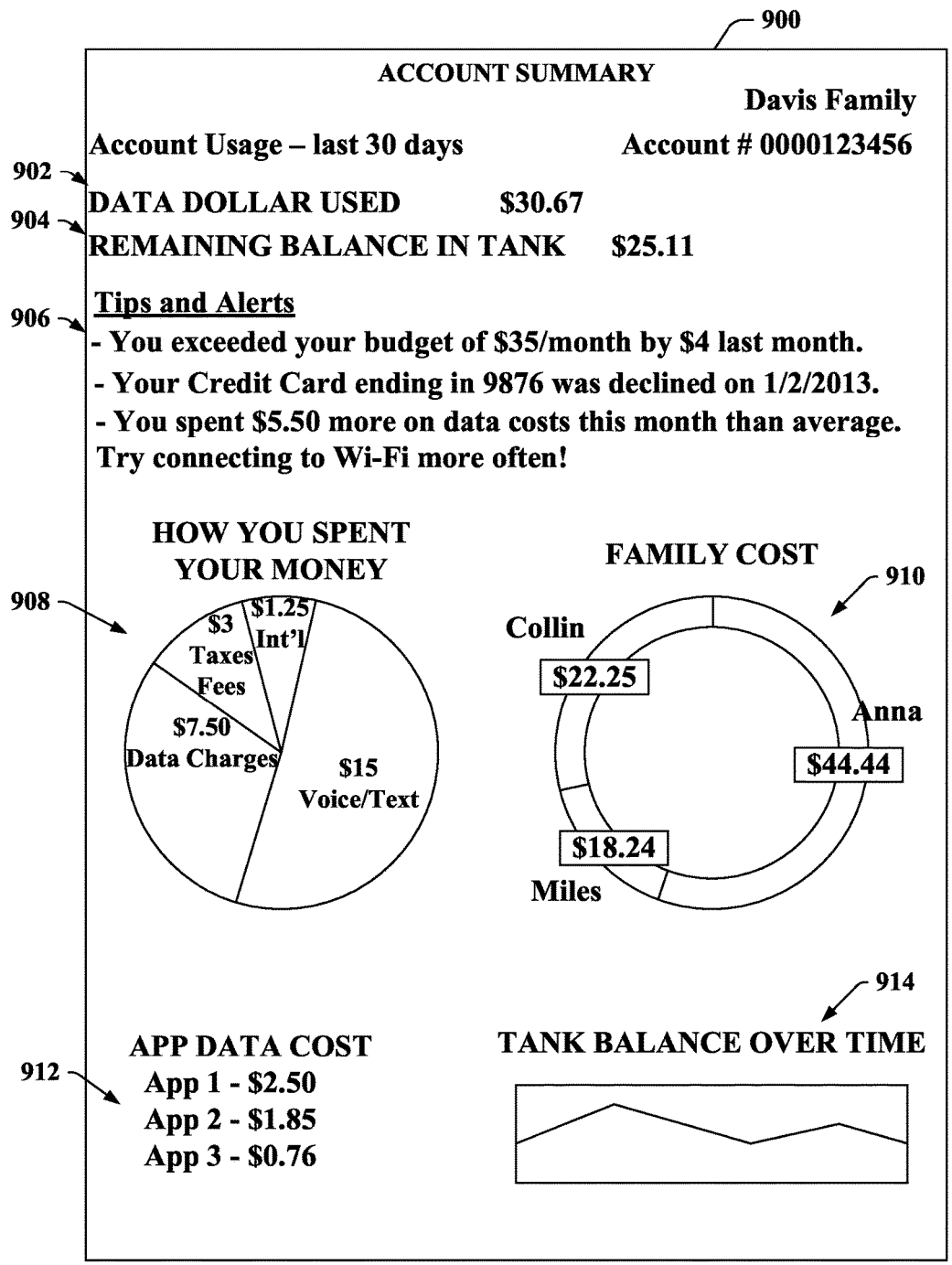
FIG. 9 illustrates an exemplary user interface that can be displayed on a display screen of a consumer computing device or a sharer computing device.

Now turning to FIG. 9, illustrated is an exemplary user interface 900 that can be displayed on a display screen of a consumer computing device or a sharer computing device (e.g., by an account visualization component). The user interface 900 provides account summary information, which can be based upon account usage information (e.g., obtained from the accounting component 704 of the community management system 114 in FIG. 7). In the depicted example of FIG. 9, the user interface 900 includes information pertaining to an amount of data dollars used 902 over a previous period of time (e.g., 30 days in the example shown) and a remaining balance in a tank 904 for a particular account.

According to an example, a consumer computing device (e.g., a mobile device) can consume network bandwidth capacity of a community Wi-Fi network as opposed to a mobile operator network to obtain cost savings and enhanced connection speeds (e.g., by utilizing Wi-Fi as opposed to a mobile operator network). Thus, the user interface 900 can include tips and alerts 906, which can be notifications to enhance an experience of a user of the consumer computing device. The tips and alerts 906 can surface as notifications included in the user interface 900. According to other examples, the tips and alerts 906 can surface as tips that can be presented responsive to a user query or "Did you know?" messages on a bill. For example, as shown in FIG. 9, the tips and alerts 906 can indicate that a budget of an account has been exceeded, a credit card was declined, or an amount spent on data costs this month is more than the average for the particular account, thereby suggesting to connect to the community Wi-Fi network more often.

Moreover, it is contemplated that other tips and alerts can be included in the user interface 900. Below are various examples of other types of tips and alerts that can be presented via the user interface 900. "You make several calls from this geographic location several times a week and it has available Wi-Fi via the community Wi-Fi network. If you set up the community Wi-Fi network here, you could save $19 a month." "You typically make international calls from this map location every Sunday. If you waited until you got to a Wi-Fi spot, you could save $15 on each call." "Over 50% of your data charges are through the movie preview app using cellular data. Consider using this app while on the community Wi-Fi network in order to save as much as $15 per month." It is to be appreciated that the foregoing examples are provided for illustration purposes, and the claimed subject matter is not so limited.

Further, the user interface 900 includes a graph 908 that depicts how money from the user account has been spent (e.g., for different types of applications). Additionally, the user interface 900 includes a graph 910 showing cost for each user in a group (e.g., family) associated with the account. Further, the user interface 900 includes information pertaining to costs for various data applications 912. Moreover, the user interface 900 includes a graph 914 depicting the tank balance over time. It is to be appreciated, however, that the claimed subject matter is not limited to the exemplary user interface 900, as various modifications are intended to fall within the scope of the hereto appended claims.

Figure 10:
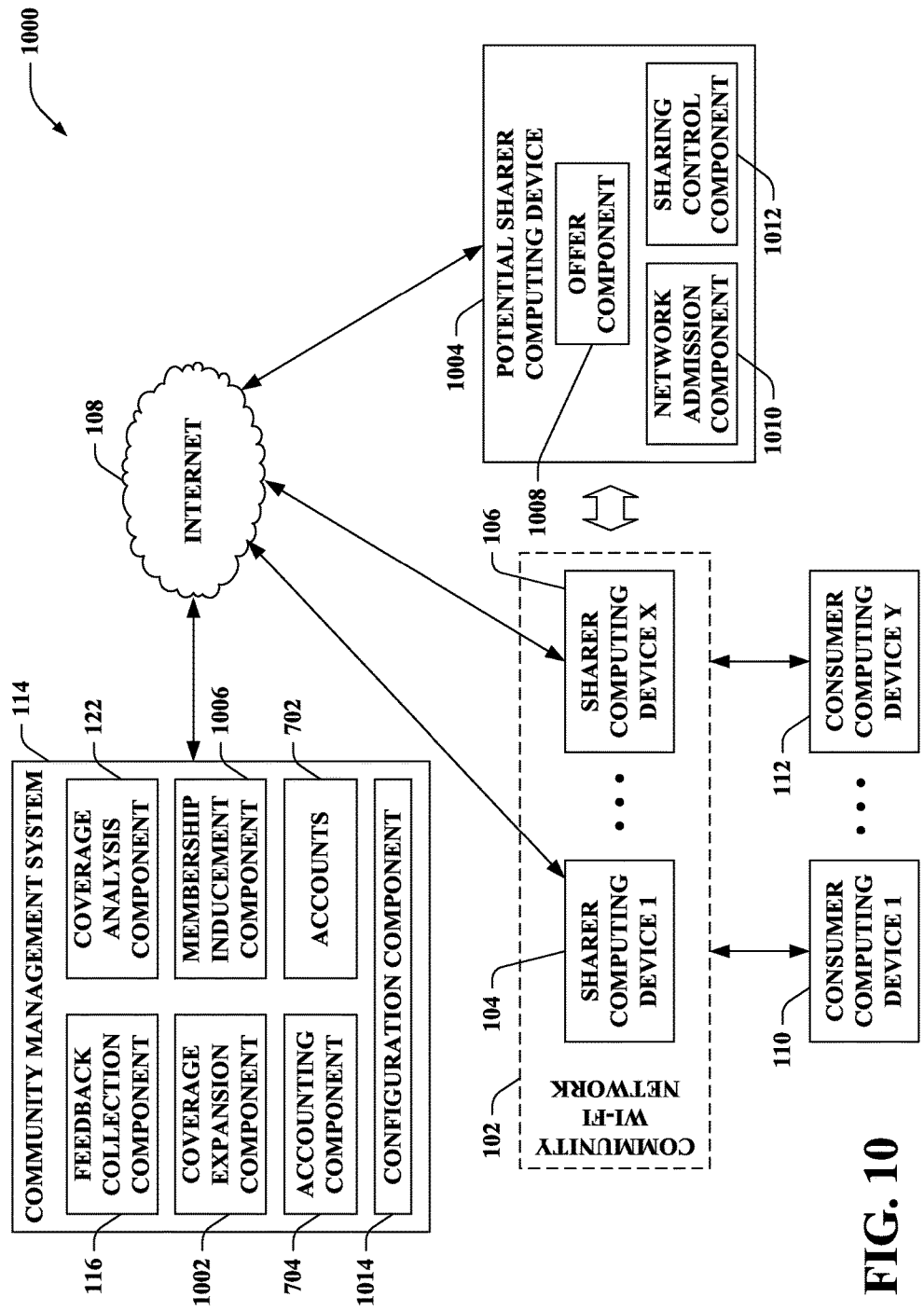
FIG. 10 illustrates a functional block diagram of an exemplary system that analyzes coverage of the community Wi-Fi network to detect geographic locations at which it is desirable to add potential sharer computing devices.

Turning to FIG. 10, illustrated is a system 1000 that analyzes coverage of the community Wi-Fi network 102 to detect geographic locations at which it is desirable to add potential sharer computing devices. The system 1000 includes the community Wi-Fi network 102, which includes the sharer computing devices 104-106. Further, the system 1000 includes the consumer computing devices 110-112 and the community management system 114. The community management system 114 includes the feedback collection component 116, the coverage analysis component 122, the accounts 702, and the accounting component 704.

Moreover, the community management system 114 can include a coverage expansion component 1002 that evaluates the network coverage data of the community Wi-Fi network 102 generated by the coverage analysis component 122 to detect a geographic location at which network coverage is desirably added. Moreover, the coverage expansion component 1002 can identify a potential sharer computing device 1004 positioned in the geographic location as detected.

The community management system 114 can further include a membership inducement component 1006 that provides an incentive to the potential sharer computing device 1004 to induce the potential sharer computing device 1004 to join the community Wi-Fi network 102. Incentives provided by the membership inducement component 1006 can be based on coverage and location, and can be utilized to cause users to join potential sharer computing devices to the community Wi-Fi network 102 for sharing of network bandwidth capacity.

An account (e.g., one of the accounts 702) corresponding to the potential sharer computing device 1004 can be credited according to the incentive responsive to a selection to opt in the potential sharer computing device 1004 to share a network bandwidth capacity of the potential sharer computing device 1004 with the consumer computing devices and 110-112 as part of the community Wi-Fi network 102. According to various examples, the incentive can be a function of the geographic location and the network coverage at the geographic location (e.g., greater incentives can be provided for a potential sharer computing device in an urban region versus a rural regions, greater incentives can be provided for a potential sharer computing device in a geographic location that lacks any network coverage versus a geographic location that has some network coverage, etc.). Further, the incentive can vary as a function of time (e.g., greater incentives can be provided during peak usage time periods for the community Wi-Fi network 102).

The potential sharer computing device 1004 can further include an offer component 1008, which can receive, from the community management system 114 (e.g., from the membership inducement component 1006), the incentive to opt in to share the network bandwidth capacity of the potential sharer computing device 1004 with the consumer computing devices 110-112 as part of the community Wi-Fi network 102. Moreover, the potential sharer computing device 1004 can include a network admission component 1010 and a sharing control component 1012. The network admission component 1010 can join the potential sharer computing device 1004 to the community Wi-Fi network 102 responsive to a selection to opt in the potential sharer computing device 1004 to share the network bandwidth capacity of the potential sharer computing device 1004. Moreover, the sharing control component 1012 can share the network bandwidth capacity of the potential sharer computing device 1004 with the consumer computing devices 110-112 of the community Wi-Fi network 102. Thus, an account corresponding to the potential sharer computing device 1004 can be credited according to the incentive responsive to the selection to opt in the potential sharer computing device 1004 to share the network bandwidth capacity of the potential sharer computing device 1004 with the consumer computing devices 110-112 as part of the community Wi-Fi network 102. Further, the selection can be effectuated while the incentive remains unexpired.

The community management system 114 can further include a configuration component 1014 that can control the sharer computing devices 104-106 (and the potential sharer computing devices 1004) as well as the consumer computing devices 110-112 when joined to the community Wi-Fi network 102. For example, the configuration component 1014 can control beamforming of the sharer computing devices 104-106. Further, the configuration component 1014 can control beamforming of the potential sharer computing device 1004 upon opting in to share network bandwidth capacity as part of the community Wi-Fi network 102. The configuration component 1014 can control beamforming as a function of the network coverage data of the community Wi-Fi network 102 generated by the coverage analysis component 122. Thus, by way of illustration, upon opting in, beamforming of the potential sharer computing device 1004 can be controlled by the configuration component 1014 to direct network coverage of the potential sharer computing device 1004 into a particular geographic region as determined by the coverage expansion component 1002 (e.g., antenna coverage can be extended into the particular geographic region by controlling beamforming of the potential sharer computing device 1004); however, the claimed subject matter is not so limited. Moreover, beamforming of the sharer computing devices 104-106 (and the potential sharer computing device 1004) can be controlled by the configuration component 1014 over time.

Further, the configuration component 1014 can remove computing devices from the community Wi-Fi network 102. Thus, the configuration component 1014 provides a mechanism for ejecting rogue users (e.g., to remove one or more of the sharer computing devices 104-106 and/or one or more of the consumer computing devices 110-112).

Figure 11:
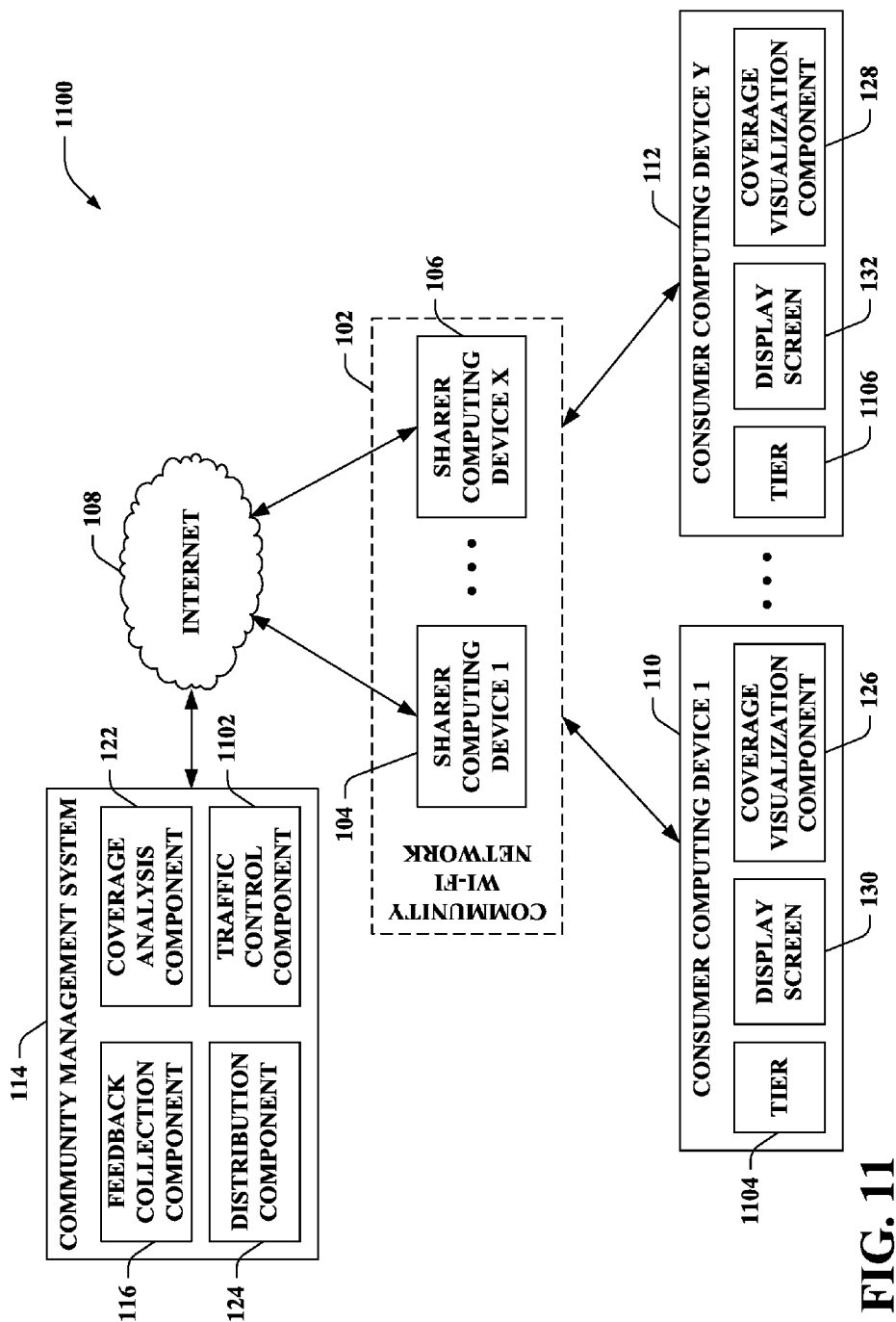
FIG. 11 illustrates a functional block diagram of an exemplary system that prioritizes traffic in the community Wi-Fi network.

Referring now to FIG. 11, illustrated is a system 1100 that prioritizes traffic in the community Wi-Fi network 102. The system 1100 includes the community Wi-Fi network 102, the community management system 114, and the consumer computing devices 110-112. The community management system 114 can further include a traffic control component 1102 that can prioritize traffic for different service levels. Different service levels can be enforced across the community Wi-Fi network 102, with traffic being prioritized as a function of the service levels. Thus, different tiers of users, each associated with differing levels of traffic prioritization, can be deployed in the community Wi-Fi network 102.

For example, an emergency tier can have highest priority traffic, followed by a tier of paying users, and then a tier of nonpaying users. According to another example, differing tiers of paying users, having differing levels of allocated bandwidth, can be supported. According to yet another example, users that provide bandwidth can have a higher priority as compared to users that do not provide bandwidth as part of the community Wi-Fi network 102. However, the claimed subject matter is not limited to the foregoing examples.

The traffic control component 1102 can prioritize traffic for a first service level over traffic for a second service level across the community Wi-Fi network 102. A first subset of the consumer computing devices 110-112 can be allocated to the first service level (e.g., part of a first tier), and a second subset of the consumer computing devices 110-112 can be allocated the second service level (e.g., part of a second tier). By way of illustration, the consumer computing device 1 110 can be part of a tier 1104, . . . , and the consumer computing device Y 112 can be part of a tier 1106. For example, the tier 1104 can be the same as the tier 1106. According to yet another example, the tier 1104 can differ from the tier 1106. Thus, traffic received from and/or addressed to the consumer computing devices 110-112 can be prioritized by the traffic control component 1102 based upon the respective tiers of the consumer computing devices 110-112.

According to yet another example, the traffic control component 1102 can throttle traffic based upon application type and/or device type. For instance, traffic associated with video calls can be throttled, whereas traffic for voice calls may not be throttled by the traffic control component 1102. Moreover, traffic can be throttled by the traffic control component 1102 as a function of platform for differing types of consumer computing devices 110-112.

Moreover, as noted above, the coverage visualization component 126 can display a map on the display screen 130 of the consumer computing device 1 110, where the map includes visual information pertaining to the geographic coverage of the community Wi-Fi network 102 relative to a geographic location of the consumer computing device 1 110. According to an example, the map displayed on the display screen 130 can include the visual information pertaining to the geographic coverage of the community Wi-Fi network 102 for a service level of the consumer computing device 1 110, where traffic is prioritized across the community Wi-Fi network 102 as a function of differing service levels. Thus, the map displayed on the display screen 130 by the coverage visualization component 126 can be a function of the tier 1104 of the consumer computing device 1 110. Coverage visualization components of other consumer computing devices can similarly render visual information pertaining to service levels corresponding to such consumer computing devices.

Figure 12:
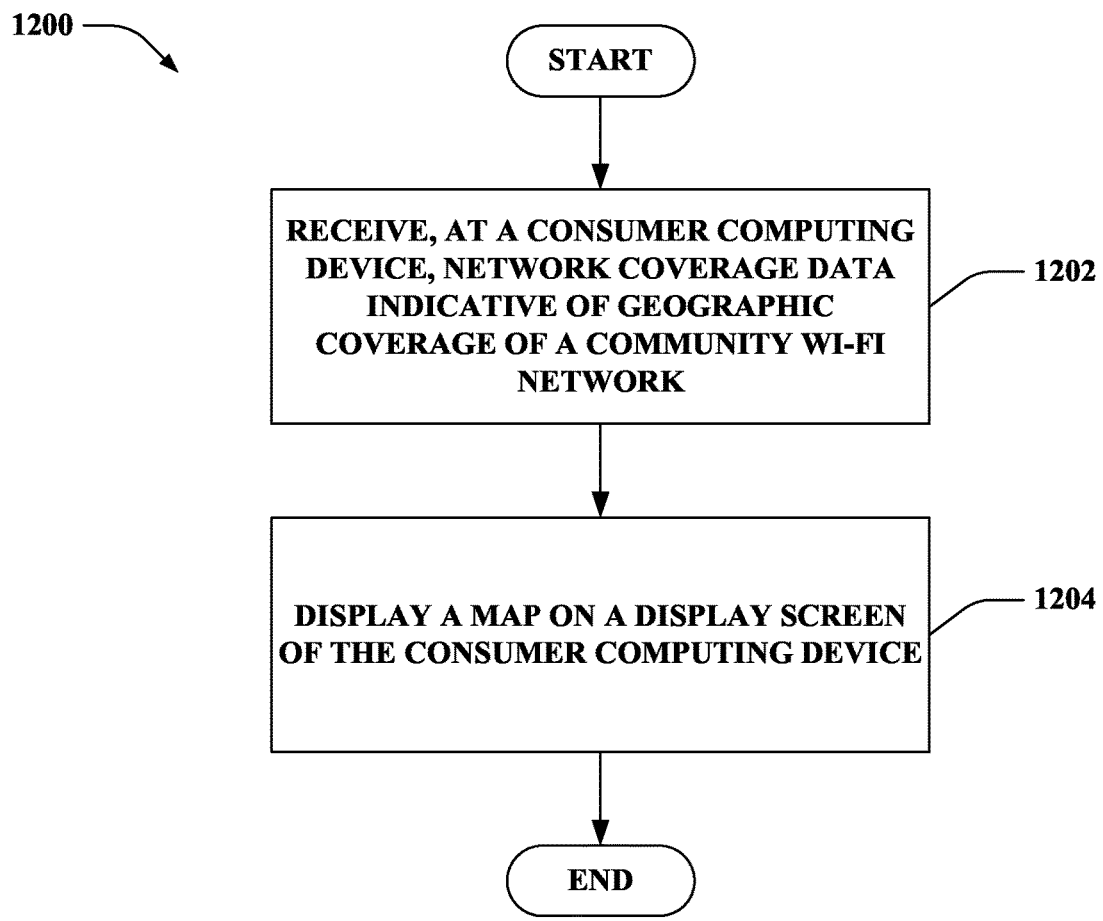
FIG. 12 is a flow diagram that illustrates an exemplary methodology of operating a consumer computing device.
Figure 13:
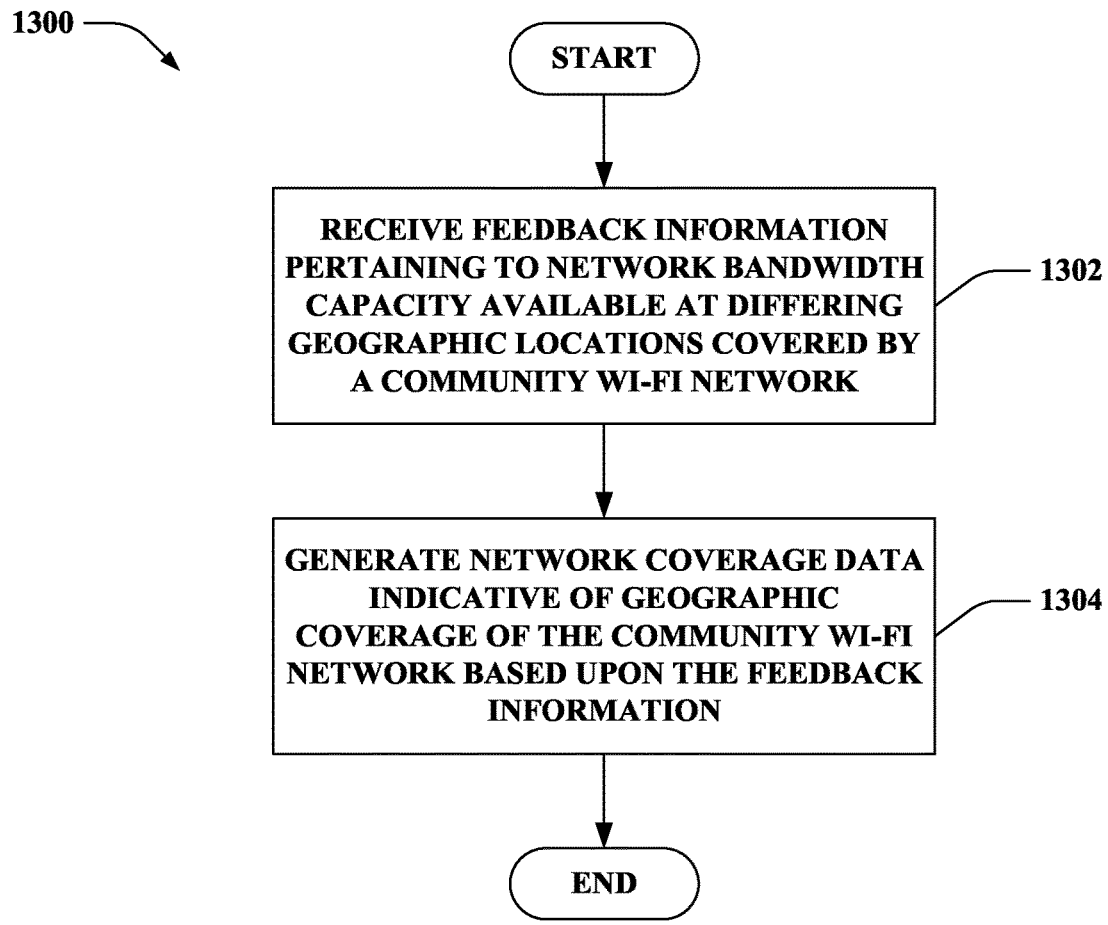
FIG. 13 is a flow diagram that illustrates an exemplary methodology of employing feedback for a community Wi-Fi network.
Figure 14:
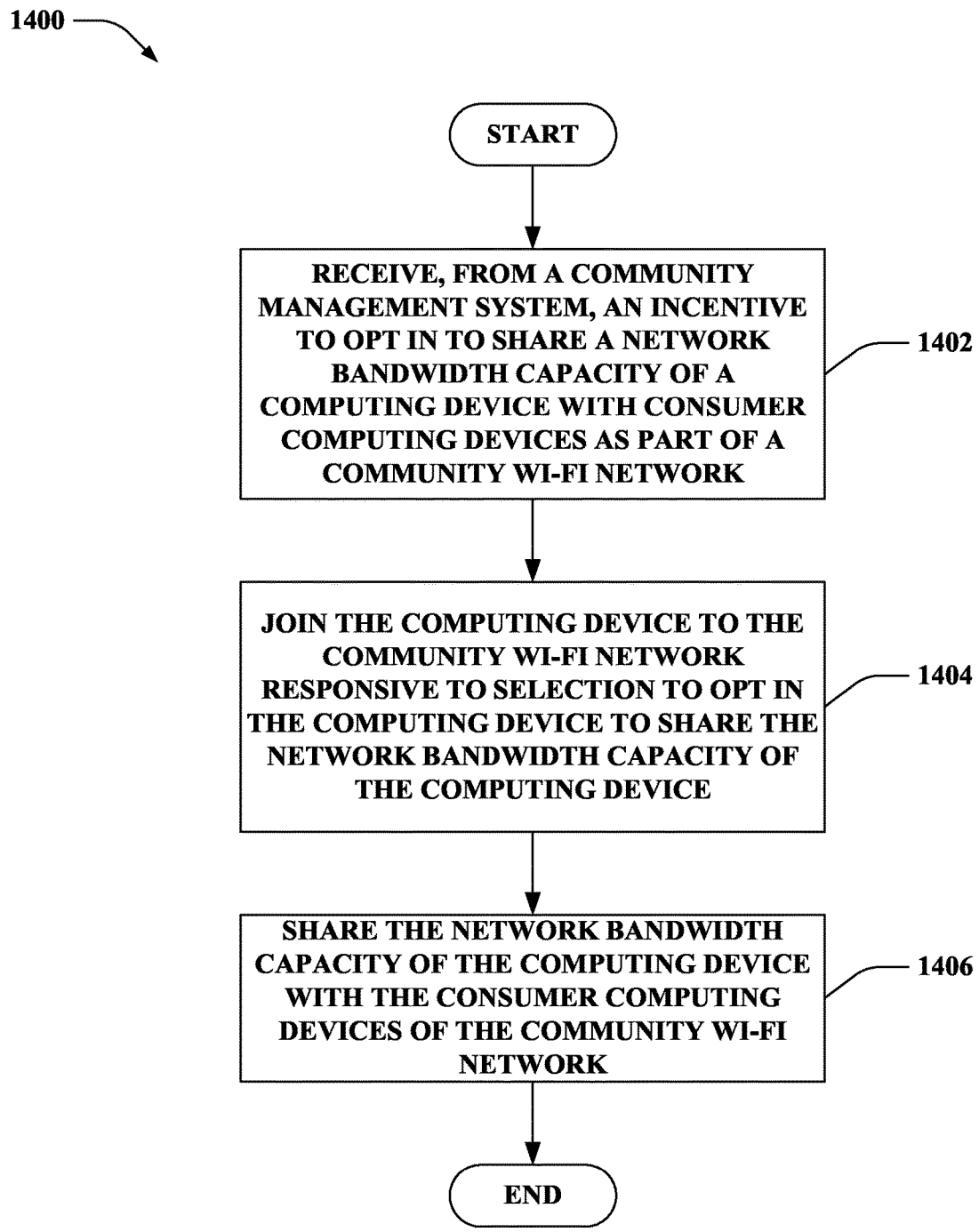
FIG. 14 is a flow diagram that illustrates an exemplary methodology of opting in a computing device to share available network bandwidth capacity with consumer computing devices of a community Wi-Fi network.

FIGS. 12-14 illustrate exemplary methodologies relating to managing, utilizing, and/or accessing a community Wi-Fi network. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 12 illustrates a methodology 1200 of operating a consumer computing device. At 1202, network coverage data indicative of geographic coverage of a community Wi-Fi network can be received at the consumer computing device. The community Wi-Fi network can include sharer computing devices in differing local networks that share respective network bandwidth capacities. At 1204, a map can be displayed on a display screen of the consumer computing device. The map can include visual information pertaining to the geographic coverage of the community Wi-Fi network relative to a geographic location of the consumer computing device.

With reference to FIG. 13, illustrated is a methodology 1300 of employing feedback for a community Wi-Fi network. At 1302, feedback information pertaining to network bandwidth capacity available at differing geographic locations covered by the community Wi-Fi network can be received. At 1304, network coverage data indicative of geographic coverage of the community Wi-Fi network can be generated based on the feedback information. For example, the network coverage data can be transmitted to consumer computing devices. According to another example, the network coverage data of the community Wi-Fi network can be evaluated to detect a geographic location at which network coverage is desirably added. Further, a potential sharer computing device, positioned in the geographic location, can be identified. Moreover, an incentive can be provided to the potential sharer computing device, where an account corresponding to the potential sharer computing device can be credited according to the incentive responsive to a selection to opt in the potential sharer computing device to share a network bandwidth capacity of the potential sharer computing device with the consumer computing devices as part of the community Wi-Fi network.

Referring now to FIG. 14, illustrated is a methodology 1400 of opting in a computing device to share available network bandwidth capacity with consumer computing devices of a community Wi-Fi network. At 1402, an incentive to opt in to share a network bandwidth capacity of a computing device with consumer computing devices as part of a community Wi-Fi network can be received from a community management system. At 1404, the computing device can be joined to the community Wi-Fi network responsive to selection to opt in the computing device to share the network bandwidth capacity of the computing device. At 1406, the network bandwidth capacity of the computing device can be shared with the consumer computing devices of the community Wi-Fi network. Accordingly, an account corresponding to the computing device can be credited according to the incentive responsive to the selection to opt in the computing device to share the network bandwidth capacity of the computing device with the consumer computing devices as part of the community Wi-Fi network, where the selection is effectuated while the incentive remains unexpired.

Figure 15:
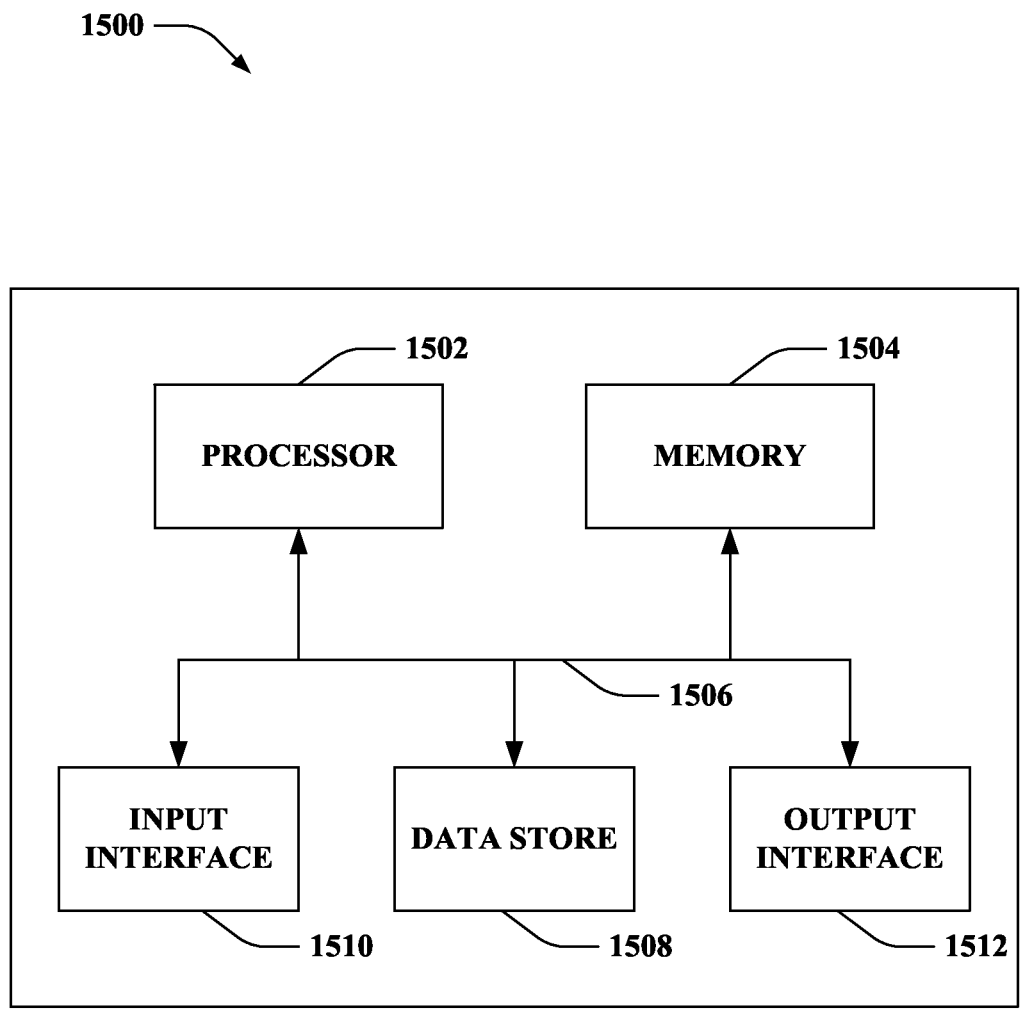
FIG. 15 illustrates an exemplary computing device.

Referring now to FIG. 15, a high-level illustration of an exemplary computing device 1500 that can be used in accordance with the systems and methodologies disclosed herein is illustrated. For instance, the computing device 1500 may be a sharer computing device or a consumer computing device. By way of another example, the computing device 1500 may be used in a community management system. The computing device 1500 includes at least one processor 1502 that executes instructions that are stored in a memory 1504. The instructions may be, for instance, instructions for implementing functionality described as being carried out by one or more components discussed above or instructions for implementing one or more of the methods described above. The processor 1502 may access the memory 1504 by way of a system bus 1506. In addition to storing executable instructions, the memory 1504 may also store network coverage data, accounts, account usage information, and so forth.

The computing device 1500 additionally includes a data store 1508 that is accessible by the processor 1502 by way of the system bus 1506. The data store 1508 may include executable instructions, network coverage data, accounts, account usage information, etc. The computing device 1500 also includes an input interface 1510 that allows external devices to communicate with the computing device 1500. For instance, the input interface 1510 may be used to receive instructions from an external computer device, from a user, etc. The computing device 1500 also includes an output interface 1512 that interfaces the computing device 1500 with one or more external devices. For example, the computing device 1500 may display text, images, etc. by way of the output interface 1512.

It is contemplated that the external devices that communicate with the computing device 1500 via the input interface 1510 and the output interface 1512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1500 may be a distributed system. Thus, for instance, several devices may be in communication by way of a network connection and may collectively perform tasks described as being performed by the computing device 1500.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of operating a consumer computing device, comprising:
   receiving, at the consumer computing device, network coverage data indicative of geographic coverage of a community Wi-Fi network, wherein the community Wi-Fi network comprises sharer computing devices in differing local networks that share respective network bandwidth capacities, wherein the geographic coverage of the community Wi-Fi network is a union of geographic coverages of the sharer computing devices that share the network bandwidth capacities available to the differing local networks, and wherein the community Wi-Fi network is accessible by the consumer computing device within the union of the geographic coverages of the sharer computing devices using the network bandwidth capacities of the differing local networks shared by the sharer computing devices; and
   displaying a map on a display screen of the consumer computing device, the map comprising visual information that specifies the geographic coverage of the community Wi-Fi network in a geographic region that comprises a geographic location of the consumer computing device.

2. The method of claim 1, further comprising displaying visual information on the display screen of the consumer computing device that specifies one or more types of applications available for execution by the consumer computing device via the community Wi-Fi network at geographic locations within the geographic region.

3. The method of claim 1, further comprising displaying visual information on the display screen of the consumer computing device that specifies one or more types of applications unavailable for execution by the consumer computing device via the community Wi-Fi network at geographic locations within the geographic region.

4. The method of claim 1, further comprising:
   receiving an indication that causes execution of a desired type of application by the consumer computing device via the community Wi-Fi network;
   determining whether a threshold network bandwidth capacity for the desired type of application is available for the consumer computing device at the geographic location of the consumer computing device via the community Wi-Fi network;
   when the threshold network bandwidth capacity is determined to be available for the consumer computing device at the geographic location via the community Wi-Fi network, initiating the execution of the desired type of application; and
   when the threshold network bandwidth capacity is determined to be unavailable for the consumer computing device at the geographic location via the community Wi-Fi network, displaying a suggestion on the display screen of the consumer computing device for achieving the threshold network bandwidth capacity.

5. The method of claim 4, wherein the suggestion specifies a disparate geographic location for repositioning of the consumer computing device, wherein the threshold network bandwidth capacity is available for the consumer computing device at the disparate geographic location via the community Wi-Fi network.

6. The method of claim 1, wherein the map displayed on the display screen comprises the visual information that specifies the geographic coverage of the community Wi-Fi network in the geographic region for a service level of the consumer computing device, wherein traffic is prioritized across the community Wi-Fi network as a function of different service levels.

7. The method of claim 1, further comprising:
measuring, with the consumer computing device, network bandwidth capacity available at the geographic location of the consumer computing device; and
transmitting, to a community management system, feedback information pertaining to the network bandwidth capacity available at the geographic location measured by the consumer computing device, wherein the network coverage data is based at least in part upon the feedback information from the consumer computing device and disparate consumer computing devices.

8. The method of claim 1, further comprising executing a client application on the consumer computing device to enable the consumer computing device to access the community Wi-Fi network.

9. The method of claim 1, further comprising displaying geographic usage information on the map on the display screen of the consumer computing device, wherein the geographic usage information is indicative of geographic locations at which the consumer computing device previously consumed network bandwidth capacity of the community Wi-Fi network.

10. The method of claim 1, further comprising displaying account usage information on the display screen of the consumer computing device, wherein the account usage information is indicative of at least consumption of network bandwidth capacity via the community Wi-Fi network for an account corresponding to the consumer computing device.

11. A community management system, comprising:
at least one processor; and
memory that comprises computer-executable instructions that, when executed by the at least one processor, cause the at least one processor to perform acts including:
receiving feedback information that specifies network bandwidth capacity of a community Wi-Fi network available at differing geographic locations covered by the community Wi-Fi network, wherein the community Wi-Fi network comprises sharer computing devices in different local networks that share respective network bandwidth capacities with consumer computing devices; and
generating network coverage data indicative of geographic coverage of the community Wi-Fi network based upon the feedback information, wherein the geographic coverage of the community Wi-Fi network is a union of geographic coverages of the sharer computing devices that share the network bandwidth capacities available to the different local networks, and wherein the community Wi-fi network is accessible by the consumer computing devices within the union of the geographic coverages of the sharer computing devices using the network bandwidth capacities of the different local networks shared by the sharer computing devices.

12. The community management system of claim 11, the memory further comprises computer-executable instructions that, when executed by the at least one processor, cause the at least one processor to perform acts including:
transmitting the network coverage data to a consumer computing device.

13. The community management system of claim 11, the memory further comprises computer-executable instructions that, when executed by the at least one processor, cause the at least one processor to perform acts including:
evaluating the network coverage data of the community Wi-Fi network to detect a geographic location at which network coverage is desirably added;
identifying a potential sharer computing device positioned in the geographic location; and
providing an incentive to the potential sharer computing device, wherein an account corresponding to the potential sharer computing device is credited according to the incentive responsive to a selection to opt in the potential sharer computing device to share a network bandwidth capacity of the potential sharer computing device with the consumer computing devices as part of the community Wi-Fi network.

14. The community management system of claim 13, wherein the incentive is a function of the geographic location and the network coverage at the geographic location.

15. The community management system of claim 13, wherein the incentive varies as a function of time.

16. The community management system of claim 11, the memory further comprises computer-executable instructions that, when executed by the at least one processor, cause the at least one processor to perform acts including:
controlling beamforming of a given sharer computing device opted in to share network bandwidth capacity of the given sharer computing device as a function of the network coverage data of the community Wi-Fi network.

17. The community management system of claim 11, the memory further comprises computer-executable instructions that, when executed by the at least one processor, cause the at least one processor to perform acts including:
prioritizing traffic for a first service level over traffic for a second service level across the community Wi-Fi network, wherein a first subset of the consumer computing devices are allocated the first service level and a second subset of the consumer computing devices are allocated the second service level.

18. The community management system of claim 11, wherein the network coverage data specifies one or more types of applications available for execution by the consumer computing devices across the geographic coverage of the community Wi-Fi network.

19. The community management system of claim 11, the memory further comprises computer-executable instructions that, when executed by the at least one processor, cause the at least one processor to perform acts including:
evaluating the network coverage data of the community Wi-Fi network to detect a geographic location at which network coverage is desirably added;
identifying a potential sharer computing device positioned in the geographic location; and
transmitting, to the potential sharer computing device, information to cause opting in of sharing a network bandwidth capacity of the potential sharer computing device as part of the community Wi-Fi network.

20. A computing device, comprising:
at least one processor; and
memory that comprises computer-executable instructions that, when executed by the at least one processor, cause the at least one processor to perform acts including:
receiving, from a community management system, an incentive to opt in to share a network bandwidth capacity of the computing device with consumer computing devices as part of a community Wi-Fi network, wherein the community Wi-Fi network comprises a mesh of sharer computing devices in disparate local networks that share respective network bandwidth capacities with the consumer computing devices of the community Wi-Fi network;

joining the computing device to the community Wi-Fi network responsive to a selection to opt in the computing device to share the network bandwidth capacity of the computing device; and sharing the network bandwidth capacity of the computing device with the consumer computing devices of the community Wi-Fi network;

wherein an account corresponding to the computing device is credited according to the incentive responsive to the selection to opt in the computing device to share the network bandwidth capacity of the computing device with the consumer computing devices as part of the community Wi-Fi network, wherein the selection is effectuated while the incentive remains unexpired.

* * * * *